(12) United States Patent
Paranthaman et al.

(10) Patent No.: US 10,807,888 B2
(45) Date of Patent: Oct. 20, 2020

(54) CARBON ELECTRODES BASED CAPACITIVE DEIONIZATION FOR THE DESALINATION OF WATER

(71) Applicant: UT-BATTELLE, LLC, Oak Ridge, TN (US)

(72) Inventors: Mariappan Paranthaman, Knoxville, TN (US); Amit K. Naskar, Knoxville, TN (US); Constantinos Tsouris, Oak Ridge, TN (US); Marko Robert Ivancevic, Lombard, IL (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 21 days.

(21) Appl. No.: 16/256,396

(22) Filed: Jan. 24, 2019

(65) Prior Publication Data

US 2019/0225513 A1 Jul. 25, 2019

Related U.S. Application Data

(60) Provisional application No. 62/713,120, filed on Aug. 1, 2018, provisional application No. 62/621,112, filed on Jan. 24, 2018.

(51) Int. Cl.
*C02F 1/469* (2006.01)
*C02F 1/461* (2006.01)
*C02F 103/08* (2006.01)

(52) U.S. Cl.
CPC ........ *C02F 1/4691* (2013.01); *C02F 1/46109* (2013.01); *C02F 2001/46138* (2013.01);
(Continued)

(58) Field of Classification Search
CPC ............... C02F 1/4691; C02F 1/46109; C02F 2103/08; C02F 2001/46161;
(Continued)

(56) References Cited

U.S. PATENT DOCUMENTS 6,341,057 B1 1/2002 Nissen et al.
9,441,113 B2 9/2016 Naskar et al.
(Continued)

FOREIGN PATENT DOCUMENTS

KR 2015-0035265 A 4/2015
WO 2016113139 A1 7/2016

OTHER PUBLICATIONS

International Search Report dated Mar. 28, 2019 in PCT/US19/14928.
(Continued)

*Primary Examiner* — Arun S Phasge
(74) *Attorney, Agent, or Firm* — Fox Rothschild LLP

(57) ABSTRACT

A capacitive deionization system includes first and second electrodes comprising tire derived carbon particles obtained from a carbonaceous waste-tire source material containing carbon black. A conductive polymer coating on the carbon particles forms coated carbon particles. The first electrode and the second electrode define a flow channel there between, having a first opening for conducting saline solution into the flow channel and a second opening for conducting treated saline solution from the flow channel. A first current collector is provided for the first electrode and a second current collector is provided for the second electrode. An electrical connection between the first and second electrodes. A method of making a system for the capacitive deionization of a salt from a liquid, and a method for the capacitive desalination of a saline solution are also disclosed.

36 Claims, 23 Drawing Sheets

(52) U.S. Cl.
CPC ............... *C02F 2001/46161* (2013.01); *C02F 2103/08* (2013.01); *C02F 2201/4611* (2013.01); *C02F 2201/4616* (2013.01); *C02F 2201/46115* (2013.01)

(58) Field of Classification Search
CPC .... C02F 2201/46115; C02F 2201/4616; C02F 2001/46138; C02F 2201/4611; C02F 1/441; C02F 2001/46133
See application file for complete search history.

(56) References Cited

U.S. PATENT DOCUMENTS

| | | | |
|---|---|---|---|
| 9,941,058 | B2 | 4/2018 | Naskar et al. |
| 2003/0143453 | A1 | 7/2003 | Ren et al. |
| 2004/0120100 | A1 | 6/2004 | Reynolds |
| 2004/0191632 | A1 | 9/2004 | Kelley et al. |
| 2008/0274407 | A1 | 11/2008 | Bourcier et al. |
| 2013/0068630 | A1 | 3/2013 | DePaoli et al. |
| 2013/0302697 | A1 | 11/2013 | Wang et al. |
| 2014/0346043 | A1 | 11/2014 | Andelman et al. |
| 2015/0021525 | A1 | 1/2015 | Naskar et al. |
| 2015/0047983 | A1 | 2/2015 | Mayes et al. |
| 2016/0272515 | A1* | 9/2016 | Choi .................... C25B 11/04 |
| 2016/0351346 | A1 | 12/2016 | Naskar et al. |
| 2017/0005326 | A1 | 1/2017 | Liang et al. |
| 2018/0204687 | A1 | 7/2018 | Naskar et al. |

OTHER PUBLICATIONS

Gaikwad et al.: "Polymer coated Capacitive Deionization Electrode for Desalination: A mini review", Electrochem. Energy Technol. 2016; 2:1-5.
Huang et al.: "Relation between the charge efficiency of activated carbon fiber and its desalination performance", Langmuir, 28 (2012) 5079-5084.
Porada et al.: "Water Desalination with Wires", J Phys Chem Lett, 3 (2012) 1613-1618.
Wen et al. "Three-dimensional graphene-based hierarchically porous carbon composites prepared by a dual-template strategy for capacitive deionization", Journal of Materials Chemistry A, 1 (2013).
Dong et al.: "Electrospun Composites Made of Reduced Graphene Oxide and Activated Carbon Nanofibers for Capacitive Deionization", Electrochimica Acta, 137 (2014) 388-394.
Hou et. al: "Development of multi-walled carbon nanotube/poly(vinyl alcohol) composite as electrode for capacitive deionization", Separation and Purification Technology, 130 (2014) 7-14.
Myint et al.: "Brackish water desalination by capacitive deionization using zinc oxide micro/nanostructures grafted on activated carbon cloth electrodes, Desalination", 344 (2014) 236-242.
Gao et al.: "Modification of Carbon Xerogel Electrodes for More Efficient Asymmetric Capacitive Deionization", Journal of the Electrochemical Society, 160 (2013) E106-E112.
Tsouris et al.: "Mesoporous carbon for capacitive deionization of saline water", Environ Sci Technol, 45 (2011) 10243-10249.
Chen et al.: "Electrospun carbon nanofiber networks from phenolic resin for capacitive deionization", Chemical Engineering Journal, 252 (2014) 30-37.
Xu et al.: "P-Codoped Meso-/Microporous Carbon Derived from Biomass Materials via a Dual-Activation Strategy as High-Performance Electrodes for Deionization Capacitors", ACS Sustainable Chemistry & Engineering, 5 (2017) 5810-5819.
Wang et al.: "Nitrogen-doped porous carbon derived from a bimetallic metal-organic framework as highly efficient electrodes for flow-through deionization capacitors", Journal of Materials Chemistry A, 4 (2016) 10858-10868.
Wang et al.: "In Situ Expanding Pores of Dodecahedron-like Carbon Frameworks Derived from MOFs for Enhanced Capacitive Deionization", ACS Appl Mater Interfaces, 9 (2017) 15068-15078.
Wang et al.: "Creating Nitrogen-Doped Hollow Multiyolk@Shell Carbon as High Performance Electrodes for Flow-Through Deionization Capacitors", ACS Sustainable Chemistry & Engineering, 5 (2017) 3329-3338.

* cited by examiner

CARBON ELECTRODES BASED CAPACITIVE DEIONIZATION FOR THE DESALINATION OF WATER

CROSS-REFERENCE TO RELATED APPLICATIONS

This application claims priority to U.S. Provisional Patent Application No. 62/621,112 filed on Jan. 24, 2018, and claims priority to U.S. Provisional Patent Application No. 62/713,120 filed on Aug. 1, 2018, both entitled "Novel Carbon Electrodes Based Capacitive Deionization for the Desalination of Water", the entire disclosures of which are incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates to the deionization of saline solutions, and more particularly to capacitive deionization systems and methods.

BACKGROUND OF THE INVENTION

Potable water is a scarce, critical resource on Earth. The west coast in the USA, as well as countries including India, China, and other African states already experience water scarcity. Times of water scarcity affect nearly four billion people and this problem is expected to compound as population growth continues and living standards improve. Better watershed management can improve water availability, but other advancements are also necessary to provide water resources for the future. Water purification technologies currently include distillation, membrane filtration methods, and electrodialysis. Distillation is widely used but is energy intensive compared to other desalination methods. Membrane filtration, namely reverse osmosis and nanofiltration, also are widely used for full-scale desalination. Materials using physical separation methods suffer from fouling issues as well as complications with chemical and thermal tolerance. These issues lead to difficulties, with membrane maintenance decreasing their overall longevity. Reverse osmosis is further complicated by elevated temperature, pressure, and specific pH operational ranges. Electrodialysis uses stacks of cationic and anionic membranes with applied electric current to channel ions between streams of concentrated and dilute salt solutions. This method is restricted to pre-reverse osmosis treatment of seawater, due to decreased solution conductivity at low salt concentrations. Electrodialysis, while less costly than thermal distillation and reverse osmosis, is still expensive compared to more advanced desalination methods. Thus, researching alternative desalination techniques that are both energy efficient and economically feasible is a topic of growing interest.

One such method is capacitive deionization (CDI). CDI demonstrates promise as a more cost-effective and efficient water purification method, compared to current technology. CDI processes operate at ambient pressures, low temperatures, and small cell voltages, allowing for cheap, scalable systems. CDI also has the ability to be more efficient than the current industry standard, reverse osmosis, at lower salt concentrations. The electrodes used for CDI at industrial scales are predominantly activated carbon, due to its low cost.

CDI operates by sending a potential difference across a set of electrodes submerged in an aqueous solution containing ions. The electrodes are composed of an active material coated onto a current collector with a binding agent. When the potential has been applied to the electrodes, positive and negative ions in the solution migrate to their respective counter-charged electrodes. They then adsorb onto the electrode surface and are held in place via an electrostatic attraction. This adsorption mechanism is reversible, and by reversing or zeroing the applied potential, the intercalated surface ions can be discharged back into the solution, allowing the electrodes to regenerate and be reused. It is possible to use a solar cell or other renewal forms of energy to initiate the CDI process. There are many different models to describe the interfacial interaction between the solution and the electrode surface. The most elementary of these is the electrical double layer (EDL) model. Here, the model assumes that kinetics will not limit the rate, the concentration will not affect charge transfer, and that side faradaic reactions that may occur will be negligible to cell performance. The Gouy-Chapman-Stern double-layer theory takes into account the omissions from the EDL model offering a more robust explanation of the interplay between the electrode structure and salt solution.

CDI has been performed with various carbon-based materials, including: carbon aerogels, carbon nanotubes, ordered mesoporous carbon, carbon nanofibers, metal-organic-framework derived porous carbon, graphene and graphene oxide-derived materials, and carbide and nitride-derived carbon. CDI is also possible with mixed-metal oxide composites, redox-active flow electrodes, and microbial fuel cells. These methods have adsorption values comparable to carbon-based materials and polymers, but suffer from the same issues, such as material costs, electrode degradation during cycling, and scaling issues.

The materials discussed above suffer from rapid degradation during CDI operation. This problem stems from faradaic reactions that occur on the surface and within pore structures. These reactions lead to a decline in desalination performance, with a commensurate increase in energy consumption. Ionic membranes mitigate electrode degradation by preventing ion crossover and maintaining the EDL. The inclusion of membranes also limits the formation of reduced oxygen species at the cathode, decreasing deleterious side reactions, increasing cell longevity. One drawback that affects both RO and CDI systems is the large cost and production scalability of ionic membranes. The other materials required for CDI—carbon black, polymer, and binder—are less expensive. The system still holds future promise with cost improvements to either these materials or membrane systems.

Researchers at the Oak Ridge National Laboratory (ORNL) have developed a method for converting waste automobile tires into a cheap, reliable source of carbon suitable for use in CDI. Tires pose a great waste issue after their product lifetime. They generate human health concerns because by providing breeding sites for mosquitos and vermin breeding, possibilities of uncontrolled fires, and potential leaching of additives and degradation byproducts into the environment. The tire-derived carbon material has been used as an anode material for Li, Na, and K-ion batteries, pseudo-capacitors, and as a biofuel catalyst.

Examples of such tire-derived carbons are described in "Pyrolytic Carbon Black Composite and Method of Making the Same", U.S. Pat. No. 9,441,113 (Sep. 13, 2016); "Flexible and Conductive Waste Tire-Derived Carbon/Polymer Composite Paper as Pseudocapacitive Electrode", U.S. Pat. No. 9,941,058 (Apr. 10, 2018); and "Flexible and Conductive Waste Tire-Derived Carbon/Polymer Composite Paper as Pseudocapacitive Electrode", US 2018/0204687 (Jul. 19, 2018). The disclosures of the foregoing are hereby incorporated fully by reference.

SUMMARY OF THE INVENTION

A capacitive deionization system can include a first electrode comprising tire derived carbon particles obtained from a carbonaceous waste-tire source material containing carbon black. A conductive polymer coating is provided on the carbon particles of the first electrode forming first coated carbon particles. A second electrode can include tire derived carbon particles obtained from a carbonaceous waste-tire source material containing carbon black. A conductive polymer coating is provided on the carbon particles of the second electrode forming second coated carbon particles. The first electrode and the second electrode can define a flow channel there between. A first opening can be provided for conducting saline solution into the flow channel. A second opening can be provided for conducting treated saline solution from the flow channel. A first current collector can be provided for the first electrode and a second current collector can be provided for the second electrode. An electrical connection ca be between the first and second electrodes. A power source can be connected to the electrical connection for creating a field between the first and second electrodes.

The first current collector and the second current collector can be formed from a metal sheet or metal foam. The metal foam can be an open cell metal foam. The first plurality of coated carbon particles can be adhered to the open cell metal foam current collector of the first electrode, and a second plurality of coated carbon particles can be adhered to the open cell metal foam current collector of the second electrode.

An anion exchange membrane can be provided adjacent to the first electrode. A cation exchange membrane can be provided adjacent to the second electrode.

The conductive polymer coating comprises at least one selected from the group consisting of polyaniline, polythiophene, polypyrrole, poly(p-phenylene). The conductive polymer coating can be from 3 to 20 wt. % based on the total weight of the polymer carbon composite coated carbon particles. The conductive polymer coating can be from 10 to 500 nm thick.

The current collector can be formed from at least one of the selected from the group consisting of Ni, Pd, Pt, Ti, Zr, Hf, Cu, Ag, Au, and stainless steel. The current collector can include a metal foam or metal sheet having a porosity of from 5 to 70%. The current collector can include a metal foam or metal sheet having a thickness of 10 to 500 μm. The current collector can include a metal foam having a surface area of from 1 to 100 $m^2/g$.

The carbon particles can have a diameter of from 1 to 200 μm. The surface area of the carbon particles can be from 100 $m^2/g$ to 1600 $m^2/g$. The carbon particles can have a porosity of from 0.01 to 10%. The carbon particles can include pores having a pore size of from 0.02 to 80 nm.

The electrode can further include a binder for adhering the carbon particles together. The binder can include at least one selected from the group consisting of polytetrafluoroethylene (PTFE), polyvinylidene fluoride (PVDF).

The carbon particles are obtained from waste tire that has been sulfonated by contacting the carbonaceous source material with an oleum bath. The carbon particles can be obtained from waste tire that has been pyrolyzed to produce a layered carbon black containing product comprising a glassy carbon matrix phase having carbon black dispersed therein, the layered carbon black containing product having an interlayer spacing of from 0.4 to 0.5 nm. The pyrolization temperature can be from 600 to 1490° C.

A first plurality of the coated carbon particles can be suspended in the saline solution and flow through a first flow electrode. A second plurality of the coated carbon particles can be suspended in the saline solution and flow through a second flow electrode.

The electrode spacing can be from 5 mm to 50 mm. The system can be a multi-electrode system comprising multiple pairs of alternating first and second electrodes.

A method of making a system for capacitive deionization of a salt from a liquid can include the steps of providing tire derived carbon particles and coating the carbon particles with a conductive polymer. The coated carbon particles can be bound together with a binder and the carbon particles can be adhered to a respective current collector to form first and second electrodes. The first and second electrodes can be secured in spaced relation to form a saline flow channel, the flow channel having a saline solution inlet and a saline solution outlet. The first and second electrodes can be electrically connected to form a capacitor. The salt can include at least one selected from the group consisting of NaCl, LiCl, KCl, $MgCl_2$, $CaCl_2$, and $SrCl_2$. The method can include the step of providing an anion exchange membrane adjacent to the conductive polymer layer of the first electrode, and a cation exchange membrane adjacent the conductive polymer layer of the second electrode.

The carbon particles can be obtained from waste tire that has been sulfonated by contacting the carbonaceous source material with an sulfonation bath. The sulfonation bath can include a sulfonation agent of chlorosulfonic acid in 1,2 dichloroethane solution. The sulfonation bath can include between 0.1-65 wt. % $SO_3$. The sulfonation bath can include comprises 2-30 wt. % $SO_3$. The sulfonation bath can have a temperature of between −20° C. to 200° C.

The carbon particles can be obtained from waste tire that has been pyrolyzed to produce a layered carbon black containing product comprising a glassy carbon matrix phase having carbon black dispersed therein, the layered carbon black containing product having an interlayer spacing of from 0.4 to 0.5 nm. The pyrolysis step can be conducted at a temperature from 600-1490° C. The duration of the pyrolysis step can be from 1 minute to 12 hours.

The first coated carbon particles can be mixed with a binder and adhered to the first current collector. The first current collector can be an open cell metal foam or metal sheet. The second coated carbon particles can be mixed with a binder and adhered to the second current collector, where the second current collector can be an open cell metal foam or metal sheet.

The first electrode and the second electrode can be flow electrodes. The first coated carbon particles can be suspended in the saline solution and caused to flow through the first flow electrode. The second coated carbon particles can be suspended in the saline solution and caused to flow through the second flow electrode.

A method for the capacitive deionization of a saline solution can include the steps of providing a capacitive deionization system which includes a first electrode comprising tire derived carbon particles obtained from a carbonaceous waste-tire source material containing carbon black, the carbon particles of the first electrode having a conductive polymer coating forming first coated carbon particles. A second electrode can include tire derived carbon particles obtained from a carbonaceous waste-tire source material containing carbon black. A conductive polymer coating is provided on the carbon particles of the second electrode forming second coated carbon particles. The first electrode and the second electrode can include a first current collector and a second current collector. The first electrode and the second electrode define a flow channel there between. A first opening can be provided for conducting saline solution into the flow channel. A second opening can be provided for conducting treated saline solution from the flow channel. The method can include electrically connecting the first electrode and the second electrode to a power source, whereby an electric field is created between the electrodes. Saline solution is caused to flow through the flow channel and the electric fields, wherein negative ions will be drawn to the first electrode and positive ions will be drawn to the second electrode.

The saline solution can have a salt concentration of from 1000 to 15000 PPM. The power source can be a standalone power source. The method can further include the step of performing reverse osmosis on the saline solution prior to the capacitive deionization to reduce the saline concentration to at least 1700 PPM. The saline solution can include at least one selected from the group consisting of NaCl, LiCl, KCl, $MgCl_2$, $CaCl_2$, and $SrCl_2$.

BRIEF DESCRIPTION OF THE DRAWINGS

There are shown in the drawings embodiments that are presently preferred it being understood that the invention is not limited to the arrangements and instrumentalities shown, wherein:

FIG. 17A CV with a Ag/AgCl reference at various scan rates; and FIG. 17B GCD with various charge densities.

DETAILED DESCRIPTION OF THE INVENTION

Figure 1:
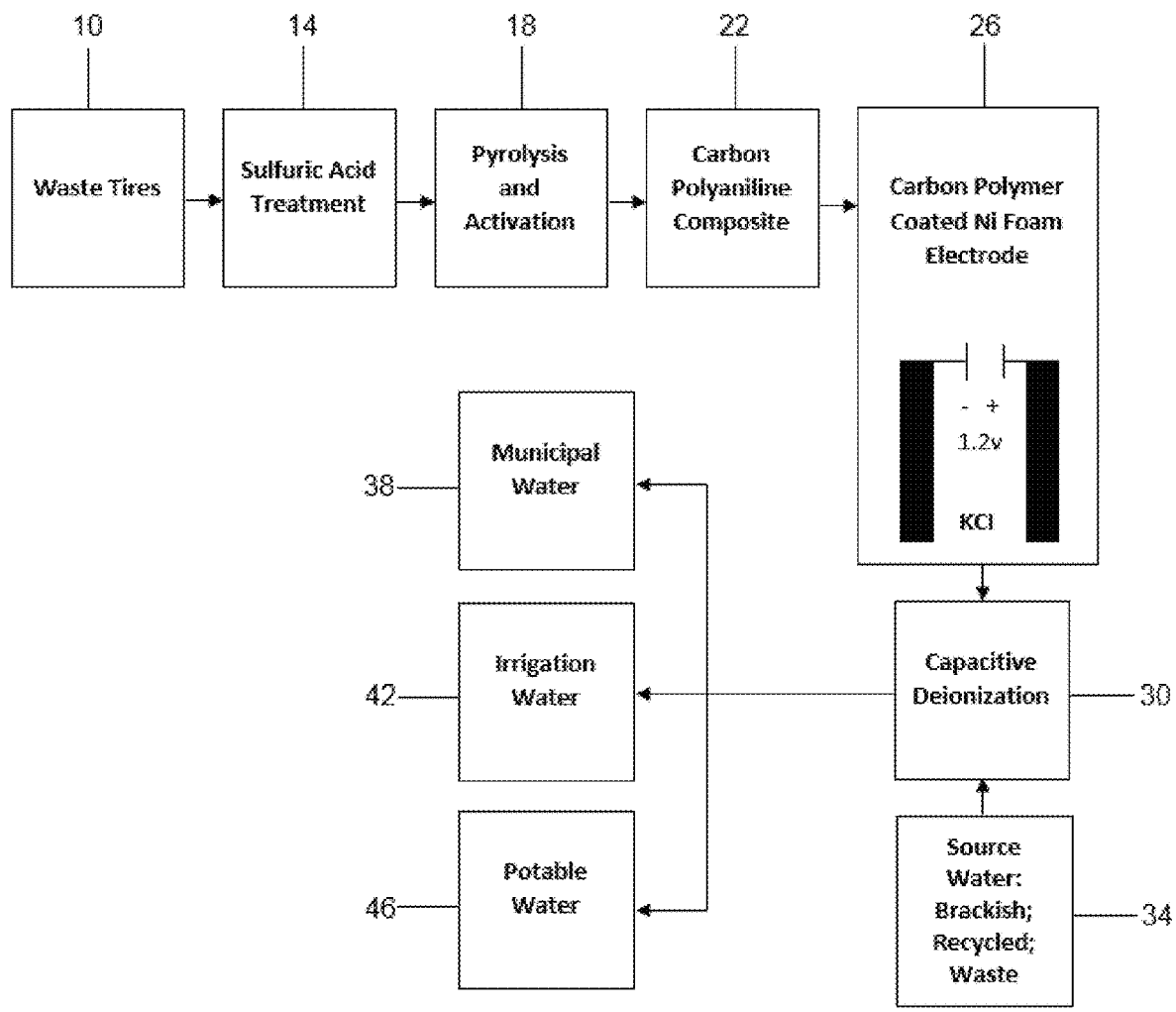
FIG. 1 is a process flow chart depicting starting tire material, chemical treatments and coatings, electrode preparation, and electrode use in CDI that leads to purified water products.

The invention utilizes tire-derived carbon (TC) as an electrode material for CDI such as by the process shown in FIG. 1. As shown in FIG. 1, waste tires 10 can be subjected to sulfuric acid treatment at step 14 and pyrolysis and activation at step 18. The carbon particles can be treated with a coating of conducting polymer such as polyaniline at step 22. At step 26 the coated carbon polymer particles are adhered to a suitable current collector such as nickel foam to form an electrode and this electrode can be used to form a deionization capacitor. Capacitive deionization is conducted at step 30 where the deionization capacitor receives saline solution from source 34. Deionized water can be used, far example for municipal water 38, irrigation 42, and potable water 46.

Chemical treatment of the carbon results in the formation of unique meso/microporous morphology enabling increased adsorption of salt ions during CDI. Additionally, coating TC with a conducting polymer, such as polyaniline (PANI), forms a carbon polymer composite (CPC) that further improves the material's electrochemical properties. The conducting polymer coating can completely cover all sides of the carbon particles. Due to its derivation from waste tires and inexpensive polymer, there is a reduction in cost compared to other highly engineered carbons and composites. Electrodes prepared from the tire-derived CPC achieved 14.2 mg/g of salt removal from 1500-1700 ppm KCl solutions in a batch process. Using a continuous flow-through process with ionic membrane assistance, 18.9 mg/g of salt was removed from 1500-1700 ppm KCl solutions. These salt adsorption values were comparable to other state-of-the-art CDI materials. In addition to strong adsorption capacities, the CPC electrodes display robust cycling performance, retaining 92.8% charging capacity after 300 cycles.

A capacitive deionization system according to the invention includes a first electrode comprising tire derived carbon particles obtained from a carbonaceous waste-tire source material containing carbon black. A conductive polymer coating is provided on the carbon particles of the first electrode forming first coated carbon particles. A second electrode also comprises tire derived carbon particles obtained from a carbonaceous waste-tire source material containing carbon black. A conductive polymer coating on the carbon particles of the second electrode forms second coated carbon particles. The first electrode includes a first current collector and the second electrode includes a second current collector. The first electrode and the second electrode define a flow channel there between. A first opening is provided for conducting saline solution into the flow channel. A second opening is provided for conducting treated saline solution from the flow channel. An electrical connection is provided between the first and second electrodes.

Figure 2:
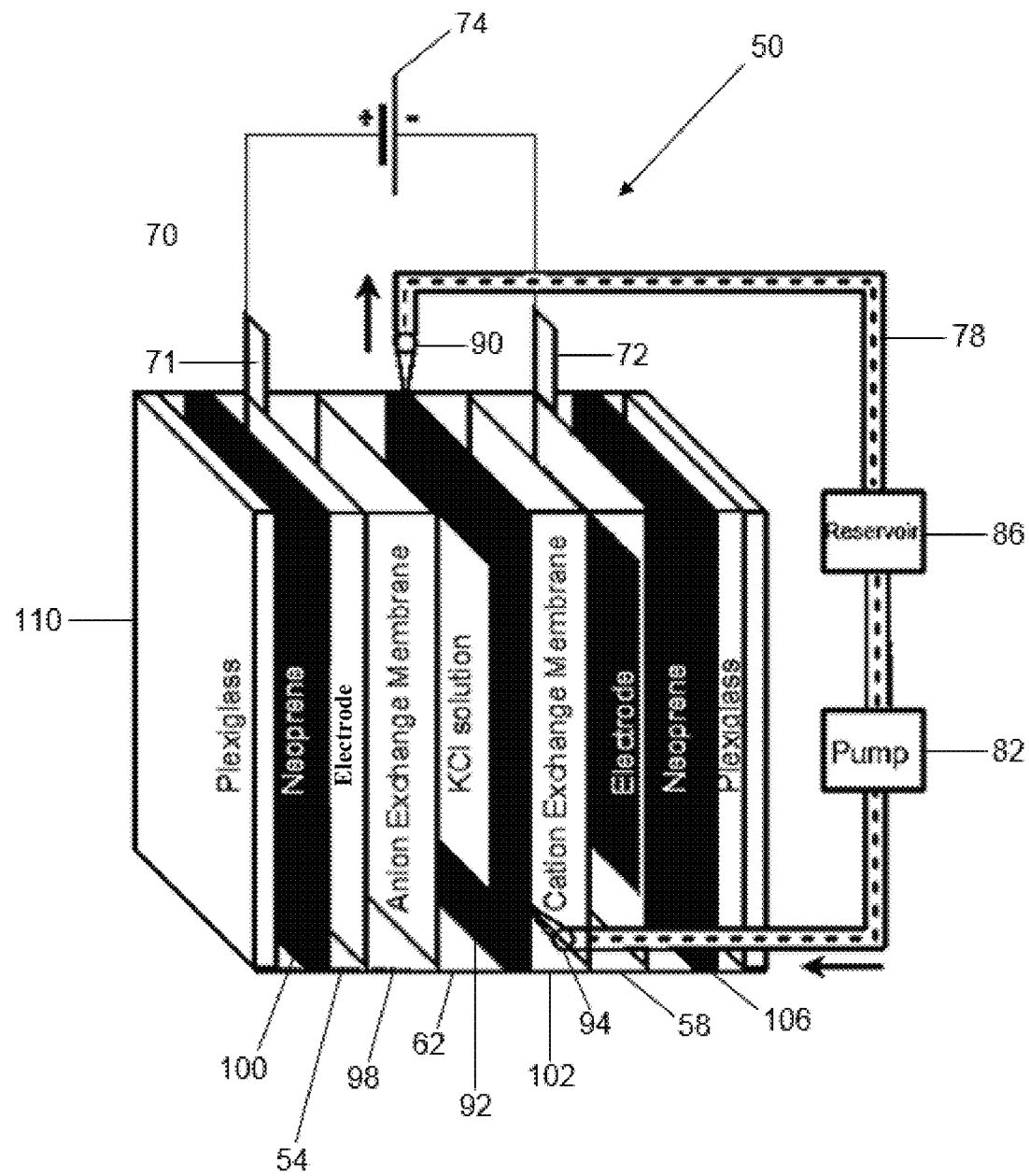
FIG. 2 is a schematic diagram of the cell used in flow and membrane CDI tests to determine electrode adsorption capacities.

A schematic diagram of a capacitive deionization system 50 according to the invention is shown in FIG. 2. A first electrode 54 and second electrode 58 are provided and create a flow channel 62 for saline solution there between. An electrical connection 70 is made between the electrodes 54 and 58, as from tabs 71 and 72 communicating with current collectors of the first electrode 54 and the second electrode 58. A power source such as battery 74 is provided to energize the capacitor. Saline solution can be supplied to the flow channel 62 and removed from the flow channel 62 by conduit 78. Conduit 78 can communicate with a pump 82 for circulating the saline solution. Flow through the capacitor 50 can be recirculated or single pass. A reservoir 86 can be provided to store saline solution. Flow into and out of the flow channel 62 can be controlled by outlet valve 90 and inlet valve 94. An anion exchange membrane 92 and cation exchange membrane 94 can optionally also be provided. A separator 92 can also be provided. Protective layers of neoprene 100 and 106 can be provided and the capacitor can be sealed by layers of plexiglass 110. Other designs are possible.

In one embodiment, the current collector comprises an open cell metal foam, and the coated carbon particles are adhered to an open cell metal foam. The electrode can include a binder for adhering the carbon particles together. The binder can be any suitable binder. The binder can be at least one selected from the group consisting of polytetrafluoroethylene (PTFE), polyvinylidene fluoride (PVDF). Other binders are possible. In another embodiment, the electrodes are flow electrodes. Other electrode configurations are possible.

A power source can be connected to the electrical connection for creating a field between the first and second electrodes. The power source can be any suitable power source. The power source can be connected to an electrical power grid. The power source can be standalone such as a generator. The power source can be from a renewable energy source, such as wind, solar, hydroelectric, and the like.

The capacitive deionization system can include an anion exchange membrane adjacent to the conductive polymer coating of the first electrode, and a cation exchange membrane adjacent the conductive polymer coating of the second electrode. Ion exchange membranes improve efficiency by restricting passage to the ion of choice. The anion exchange membrane will select for anions, and the cation exchange membrane will select for cations. The membranes reduce ion crossover that occurs during multiple electrode cycles. Ion crossover can decrease the total salt uptake due to interference from ions of different charge on the surface of the electrodes. Ionic membranes selectively allow only positively or negatively charged ions to interact with the respective electrodes, reducing this interference. Without ion crossover there is an improvement in the formation of electrical double layers, improving salt uptake. By incorporating ionic membranes for membrane-assisted capacitive deionization, MCDI, the double layer and surface-reaction issues can be reduced. Any suitable ion exchange membrane can be utilized. A suitable anion exchange membrane will allow only anions to go through the membrane and similarly the cation exchange membrane will allow only cations to go through. Cost is important, and selectivity and conductivity are also important criteria for these membranes.

The conductive polymer coating can be any suitable conductive polymer. For example, the conducting polymer can be at least one selected from the group consisting of polyaniline, polythiophene, polypyrrole, poly(p-phenylene). The conducting polymer can have a conductivity of 0.1-10-4 S/cm.

The amount of conductive polymer coating can vary. The conductive polymer coating can be 3, 4, 5, 6, 7, 8, 9, 10, 11, 12, 13, 14, 15, 16, 17, 18, 19, to 20 wt. % based on the total weight of the carbon polymer composites, or within a range of any high and low value selected from these values. The thickness of the conductive polymer coating can vary. The conductive polymer coating can be 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 340, 350, 360, 370, 380, 390, 400, 410, 420, 430, 440, 450, 460, 470, 480, 490, to 500 nm thick, or within a range of any high value and low value selected from these values.

The current collector can be of any suitable material and design. The metal foam comprises at least one of the selected from the group consisting of Ni, Pd, Pt, Ti, Zr, Hf, Cu, Ag, Au, and stainless steel. Metal foams are desirable because of the high conductivity and high surface area. The metal foam can have a porosity of 5, 10, 15, 20, 25, 30, 35, 40, 45, 50, 55, 60, 65, to 70%, or within a range of any high value and low value selected from these values. The metal foam can have a thickness of 10, 50, 100, 150, 200, 250, 300, 350, 400, 450, to 500 μm, or can have a thickness within a range of any high value and low value selected from these values. The metal foam can have a surface area of 1, 5, 10, 15, 20, 25, 30, 35, 40, 45, 50, 55, 60, 65, 70, 75, 80, 85, 90, 95 or 100 m$^2$/g, or can have a surface area within a range of any high value and low value selected from these values.

The dimensions of the carbon particles can vary. The carbon particles can have a diameter of 1, 10, 20, 30, 40, 50, 60, 70, 80, 90, 100, 110, 120, 130, 140, 150, 160, 170, 180, 190, to 200 μm, or can have a diameter within a range of any high value and low value selected from these values.

The carbon particles can have a porosity of 0.01, 1, 2, 3, 4, 5, 6, 7, 8, 9, and 10%. The carbon particles can have a porosity within a range of any high value and low value selected from these values. The carbon particles can have pores having a pore size of 0.02, 0.05, 0.1, 0.15, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, and 80 nm. The carbon particles can have pores having a pore size within a range of any high value and low value selected from these values. The surface area of the carbon particles can be 100, 200, 300, 400, 500, 600, 700, 800, 900, 1000, 1100, 1200, 1300, 1400, 1500, or 1600 $m^2/g$. The surface area of the carbon particles can be within a range of any value or low value selected from these values.

The carbon particles can be obtained from waste tire that has been pyrolyzed to produce a layered carbon black containing product comprising a glassy carbon matrix phase having carbon black dispersed therein. The layered carbon black containing product can have an interlayer spacing of from 0.4 to 0.5 nm. The pyrolization temperature can be 600, 650, 700, 750, 800, 850, 900, 950, 1000, 1050, 1100, 1150, 1200, 1250, 1300, 1350, 1400, 1450, 1500, 1550, or 1600° C. The pyrolization temperature can be within a range of any high value and low value that is selected from these values.

The electrode spacing, which can in part define the flow channel size can vary. The electrode spacing can be 2, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mm. The electrode spacing can be within a range of any high value and low value that is selected from these values.

The capacitive deionization system can be constructed using flow electrodes. Any suitable flow electrodes can be used. A first plurality of the coated carbon particles can be suspended in a first solvent and flow through a first flow electrode. A second plurality of the coated carbon particles can be suspended in a second solvent and flow through a second flow electrode.

A method of making a system for capacitive deionization of a salt from a liquid, can include the steps of: providing tire derived carbon particles, and coating the carbon particles with a conductive polymer. The coated carbon particles are provided in an electrode, such as by mixing together with a binder and adhering the carbon particles to an open cell metal foam to form first and second electrodes. The first and second electrodes can be in spaced relation to form a saline flow channel. The flow channel can have a saline inlet and a saline outlet. The first and second electrodes are electrically connected with a power source to form a capacitor.

The capacitive deionization system and method of the invention can be used to desalinate different saline solutions. The salt can be at least one selected from the group consisting of NaCl, LiCl, KCl, $MgCl_2$, $CaCl_2$, and $SrCl_2$. The saline solution can comprise mixtures of different salts.

The method can further include the step of providing an anion exchange membrane adjacent to the conductive polymer layer of the first electrode, and a cation exchange membrane adjacent the conductive polymer layer of the second electrode.

The carbon particles can be obtained from waste tire that has been sulfonated by contacting the carbonaceous source material with a sulfonation bath. Other waste rubber and rubber sources are possible. A sulfonation bath if provided can comprise a sulfonation agent such as chlorosulfonic acid in 1,2 dichloroethane solution. Other sulfonation agents are possible. The sulfonation bath can comprise between 0.1-65 wt. % $SO_3$. The sulfonation bath can comprise 2-30 wt. % $SO_3$. The sulfonation bath can have a temperature of between −20° C. to 200° C.

The carbon particles can be obtained from waste tire that has been pyrolyzed to produce a layered carbon black containing product comprising a glassy carbon matrix phase having carbon black dispersed therein. The pyrolysis step can be conducted at any suitable temperature. The pyrolysis step can be conducted at a temperature from 100-1490° C. The pyrolysis step can be conducted for any suitable duration, such as from 1 minute to 12 hours.

The first coated carbon particles are mixed with a binder and adhered to the first current collector. The first current collector can be an open cell metal foam. The second coated carbon particles are mixed with a binder and adhered to the second current collector. The second current collector can also be an open cell metal foam.

The flow capacitive deionization system can comprise a first flow electrode, and the second current collector can be a second flow electrode. The coated carbon particles are suspended in the saline solution and caused to flow through the flow electrodes. The coated carbon particles are removed and the deionized saline solution is passed for downstream utilization.

Figure 23:
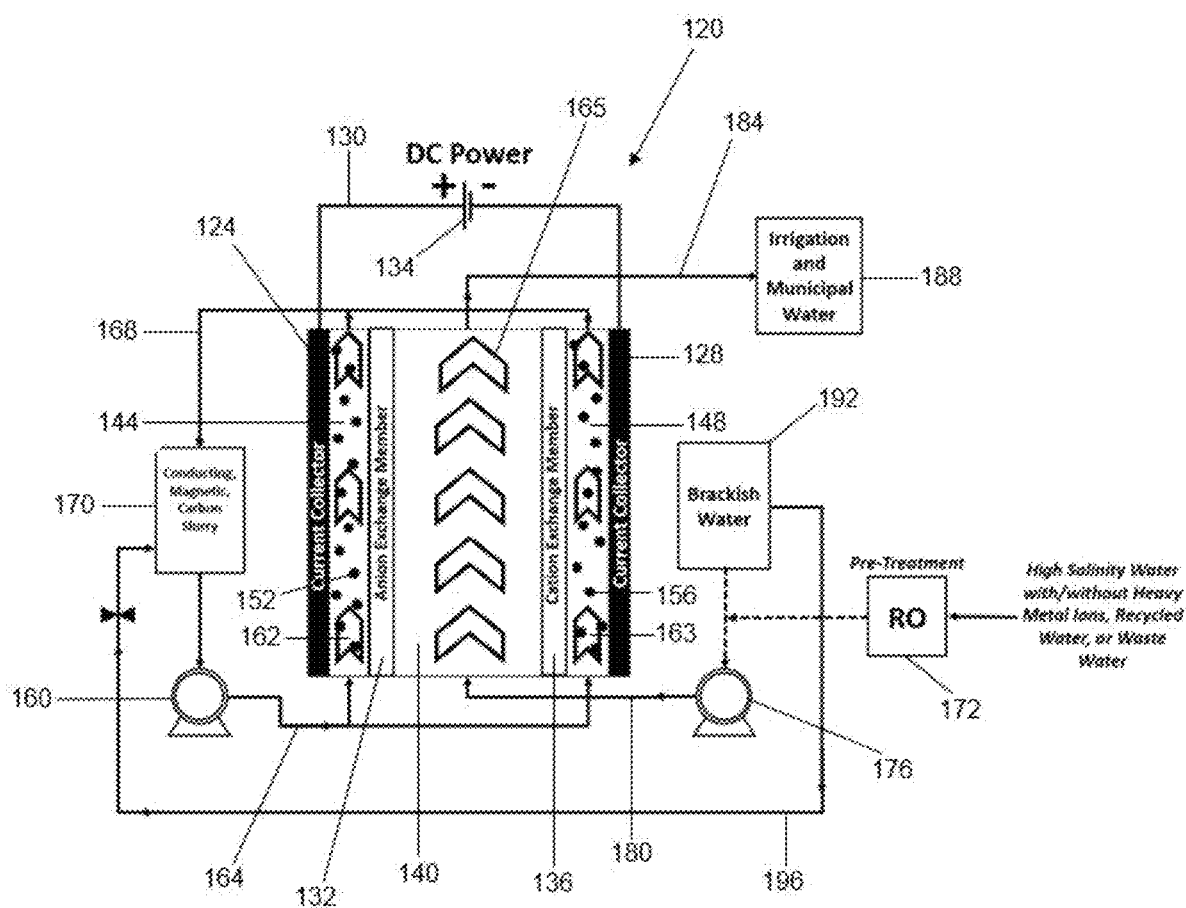
FIG. 23 is a schematic diagram of a capacitive deionization system using flow electrodes.

An example of a flow capacitor 120 is shown in FIG. 23. The capacitor 120 includes flow electrodes 124 and 128. The flow electrodes can be formed by parallel plates of a suitable material such as nickel creating a flow path 144 and 148 there between. The flow electrodes 124 and 128 are electrically connected by a suitable electrical connection 130. A power source such as battery 134 can be provided to energize the capacitor 120. The carbon particles coated with conducting polymer are suspended in the saline solution. Carbon particles coated with conducting polymer 152 are shown by arrow 162 flowing through the electrode flow path 144 and coated carbon particles 156 are shown by arrow 163 flowing through the electrode flow path 148. A pump 160 circulates the saline solution through the flow electrodes by means of a supply conduit 164 and exhaust conduit 168 flowing to particle removal station 170. Saline solution flows in the direction shown by arrows 165 and is provided as from pretreatment 172 such as reverse osmosis. The saline solution is circulated by a pump 176 through an inlet conduit 180 and an exhaust conduit 184 to downstream utilization such as irrigation and municipal water 188. Recirculation of the saline solution can be provided by recirculation conduit 196.

A method for the capacitive deionization of a saline solution includes the steps of: providing a capacitive deionization system comprising a first electrode comprising tire derived carbon particles obtained from a carbonaceous waste-tire source material containing carbon black, having a conductive polymer coating on the carbon particles of the first electrode. The carbon particles can be adhered to an open cell metal foam. A second electrode comprises tire derived carbon particles obtained from a carbonaceous waste-tire source material containing carbon black, having a conductive polymer coating on the carbon particles of the second electrode. The carbon particles can be adhered to an open cell metal foam. The first electrode and the second electrode define a flow channel there between. A first opening for conducting saline solution into the flow channel and a second opening for removing treated saline solution from the flow channel can be provided. The first electrode and the second electrode are electrically connected to a power source, whereby an electric field is created between the electrodes. The saline solution is caused to flow through the flow channel and the electric fields, wherein negative ions will be drawn to the first electrode and positive ions will be drawn to the second electrode. Multiple pairs of positive-negative electrodes can be used.

The saline solution can have a salt concentration of from 1000 to 15000 PPM. The saline solution can have a salt concentration of 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1800, 1900, 2000, 2500, 3000, 3500, 4000, 4500, 5000, 5500, 6000, 6500, 7000, 7500, 8000, 8500, 9000, 9500, 10000, 10500, 1100, 11500, 12000, 12500, 13000, 13500, 14000, 14500, and 15000 PPM. The salt concentration can be within a range of any high and low value selected from these values. The method can include the step of performing reverse osmosis on the saline solution prior to the capacitive deionization to reduce the saline concentration to at least 1700 PPM.

Example

Crumb tire rubber was soaked in concentrated sulfuric acid and then washed. The TC was pyrolyzed under a nitrogen atmosphere from room temperature to 400° C. at 1° C./min, then from 400° C. to 1100° C. at 2° C./min, then allowed to cool back to room temperature. Following heat treatment, the carbon was etched in HF solution (Sigma Aldrich, ≥48%) to remove any impurities. The etched carbon was then ground together with KOH (Sigma Aldrich, ≥85%) in a 1:4 weight ratio. The subsequent mixture was pyrolyzed under a nitrogen atmosphere for 1 h at 800° C. at 10° C./min ramp rate to enhance porosity. Alkali chemical treatment is known to increase microporosity in carbon materials while still leaving behind existing mesoporous structures.

Electrodes were prepared. 60 μL of aniline (Sigma Aldrich, ≥99.5%) was dissolved in 10 mL of 1 M HCl (Macron, ACS reagent) solution. 60 mg of ammonium peroxydisulfate (Sigma Aldrich, ≤98%) was also dissolved in 10 mL of 1 M HCl. Carbon was soaked in 1 M HCl and sonicated for 30 min. Aniline and ammonium peroxydisulfate were then added to the TC mixture. The formation of green color solution indicated that polymerization was underway. The mixture was stirred overnight to ensure full polymerization and subsequent PANI coating onto the surface of the TC. The solid was washed with ethanol and water until it had a neutral pH. A slurry was prepared by combining the CPC with 15 wt. % of polytetrafluoroethylene (Aldrich, powder 35 μm particle size) (PTFE) binding material and ethanol. Nickel foam current collectors (15 cm×8 cm) (source: MTI Corp.; 99.99% pure; ≥95% porosity; 80-100 pores per inch; 1.6 mm thick) were coated with a slurry of active material, creating an electrode with dimensions of 7.5×4.4 cm². The electrodes were pressed under 3 tons of pressure for 10 min, rinsed with deionized-distilled water to remove loose carbon, then dried. The two electrodes together contained 23.2 mg of active material (CPC) per cm².

X-ray diffraction (XRD) patterns were collected on a PANalytical Empyrean with a Cu Kα radiation. All data were processed with HighScore Plus. Brunauer-Emmett-Teller (BET) surface areas, and pore-size distributions were determined from nitrogen adsorption isotherms at 77° K using Autosorb-1 from Quantachrome. The pore-size distributions and pore volumes were calculated from the DFT/Monte Carlo method using the QSDFT adsorption branch model. The thermogravimetric analysis (TGA) was completed using a TGA Q5000 (TA instrument, USA) under air-flow heating from room temperature to 1000° C. Fourier transform infrared (FT-IR) spectroscopy was performed using a Varian 640 spectrometer (Agilent Technologies, spectral resolution of 0.18 cm$^{-1}$). All samples were mixed with KBr (Sigma Aldrich) and pressed into a pellet for analysis. The KBr pellets with sample present were prepared in a 1:200 ratio (sample:KBr), was ground with a mortar and pestle, and pressed into a transparent film for analysis. Raman spectra were collected on a WiTec alpha 300 M+. All Raman data presented were acquired by using a 633 nm wavelength laser; applying 1.2 mW. Scanning electron microscopy (SEM) images were collected on a Zeiss Merlin with a gun acceleration of 10.0 kV. Energy-dispersive X-ray spectroscopy (EDS) elemental mappings and spectra were collected with an acceleration voltage of 15.0 kV. Transmission electron microscopy (TEM) was performed on an aberration-corrected FEI Titan S 80-300 STEM/TEM microscope equipped with a Gatan OneView camera at an acceleration voltage of 300 kV. X-ray photoelectron spectroscopy (XPS) spectra were collected for each powder sample on a Thermo K-Alpha XPS system with a spot size of 400 μm at an energy resolution of 0.1 eV. AM data were analyzed using Thermo Avantage, a software package provided by Thermo-Scientific. The electrochemical analysis was performed using a VersaStat 3-200 potentiostat/galvanostat. A Bio-Logic VSP potentiostat was used for 3-electrode cyclic voltammetry measurements of the material vs Ag/AgCl as the reference and platinum mesh as the counter electrode. The specific capacitance of the composite material was calculated using Equation 1:

$$C = 2\left(\frac{2I}{vm\Delta V}\right) \quad (1)$$

where C is capacitance, I is current density, v is the sweep rate, m is the mass of the active electrode material, and ΔV is the potential window. The equation is then doubled since there are two symmetric electrodes in the cell.

CDI tests in a batch CDI cell and flow cell such as that depicted in FIG. 2. These tests were conducted using 1500-1700 ppm solutions of KCl (Alfa Aesar, >99%), LiCl (Sigma Aldrich, >99%), NaCl (Beantown Chemical, 99%), MgCl$_2$ (Amresco, 99%), CaCl$_2$) (EM Science, 99.5%). KCl was chosen for initial experiments due to the similar electrophoretic mobility of K$^+$ and Cl$^-$ ions as opposed to Na$^+$ and Cl$^-$. The voltage was kept at a constant 1.2 V for charging and 0 V for discharging. For flow-cell tests, a Rainin Rabbit-Plus peristaltic pump was used with a flow rate of 30.0 mL/min. Charging and discharging cycles lasted for 30 minutes each. After one cycle, deionized-distilled water was run through the flow cell to remove residual KCl. The concentration change was measured with a Hach Pocket Pro™ Tester (range 0 to 1999 ppm, ±1%). The salt adsorption capacity (SAC) was calculated using equation 2:

$$SAC = \frac{V(C_o - C)}{m} \quad (2)$$

where V is the volume of brine solution (in L), $C_o$ is the starting concentration (in mg/L), C is the concentration at peak capacitor charge (in mg/L), and m is the mass (g) of active electrode material. The use of ion exchange membranes in the flow cell follows, where the anion exchange membrane was AR103-QDP and the cation exchange membrane was CR61-CMP (GE Water, Inc., Watermelon, Pa.).

Degradation tests were conducted by cycling the electrodes using an Arbin Instruments BT-200 and MITS Pro software. Symmetric electrodes were set up in a Swagelok cell with 1 M KCl electrolyte. The test consisted of 300 cycles of charging the electrodes at a constant current density of 500 mA/g up to the voltage cap of 1.2 V and discharging at −500 mA/g until a voltage of 0 was reached. Electrode degradation was determined by comparing the initial and final charging capacities from the cycles and calculating the percent difference.

Figure 3:
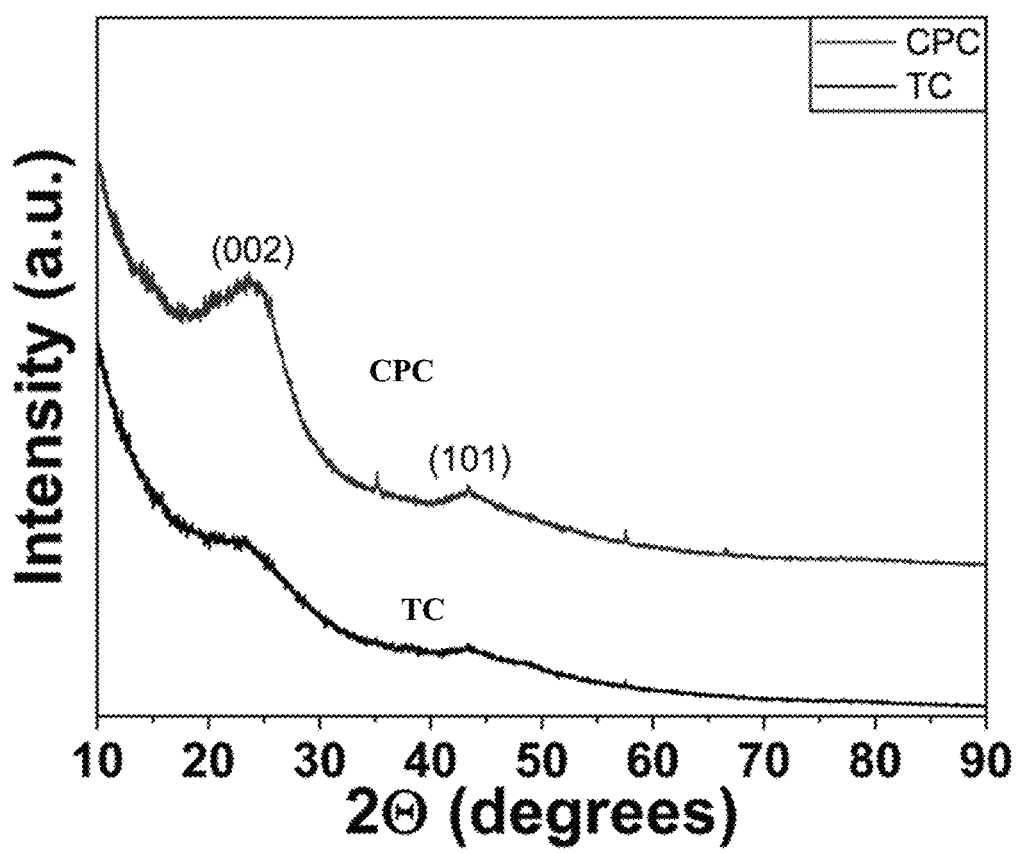
FIG. 3 is a plot of intensity (a.u.) vs. 2Θ (degrees), and presents XRD spectra of tire carbon (TC) and (carbon polymer composite, CPC) from 10-90 2Θ.
Figure 4:
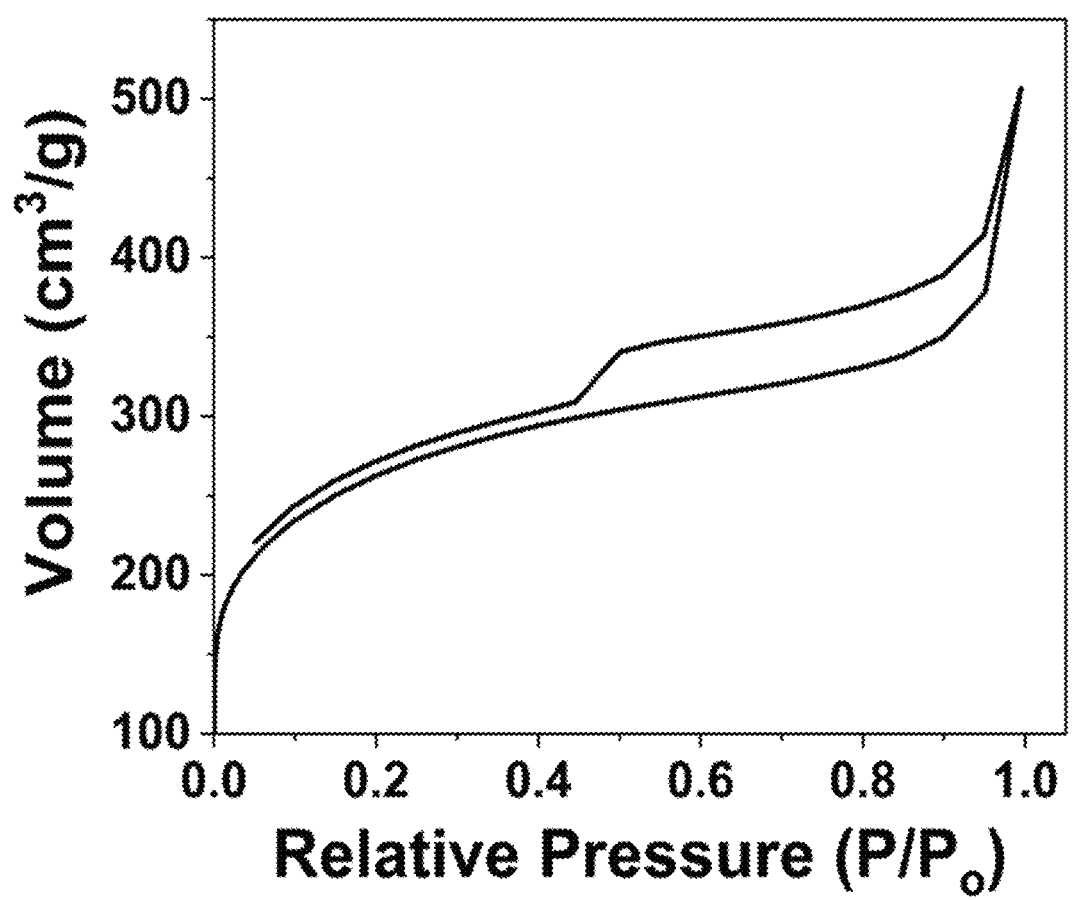
FIG. 4 is a plot of volume per mass ($cm^3/g$) vs. relative pressure ($P/P_o$), and presents an adsorption-desorption isotherm of KOH-treated carbon, with a calculated surface area of 952 $m^2/g$.
Figure 5:
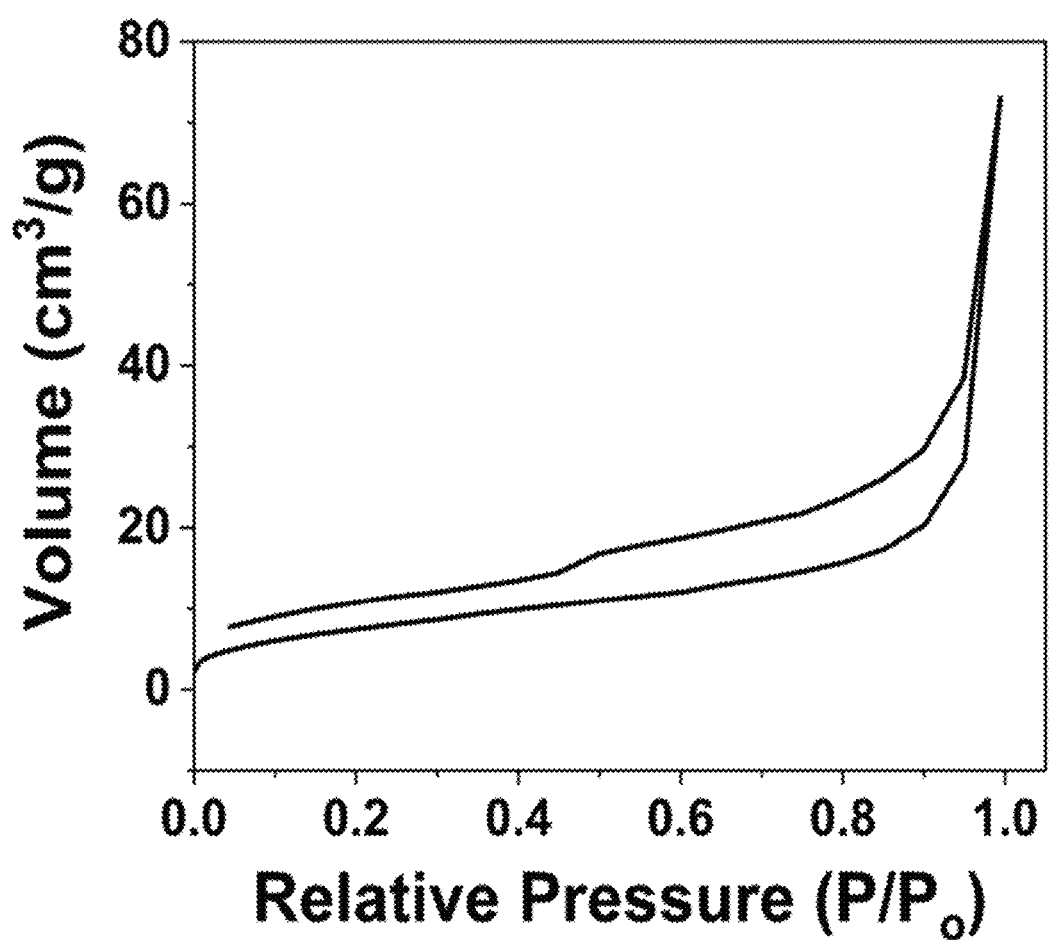
FIG. 5 is a plot of volume per mass ($cm^3/g$) vs. relative pressure (P/Po), and presents an adsorption-desorption isotherm of CPC, with a calculated surface area of 28.0 $m^2/g$.
Figure 6:
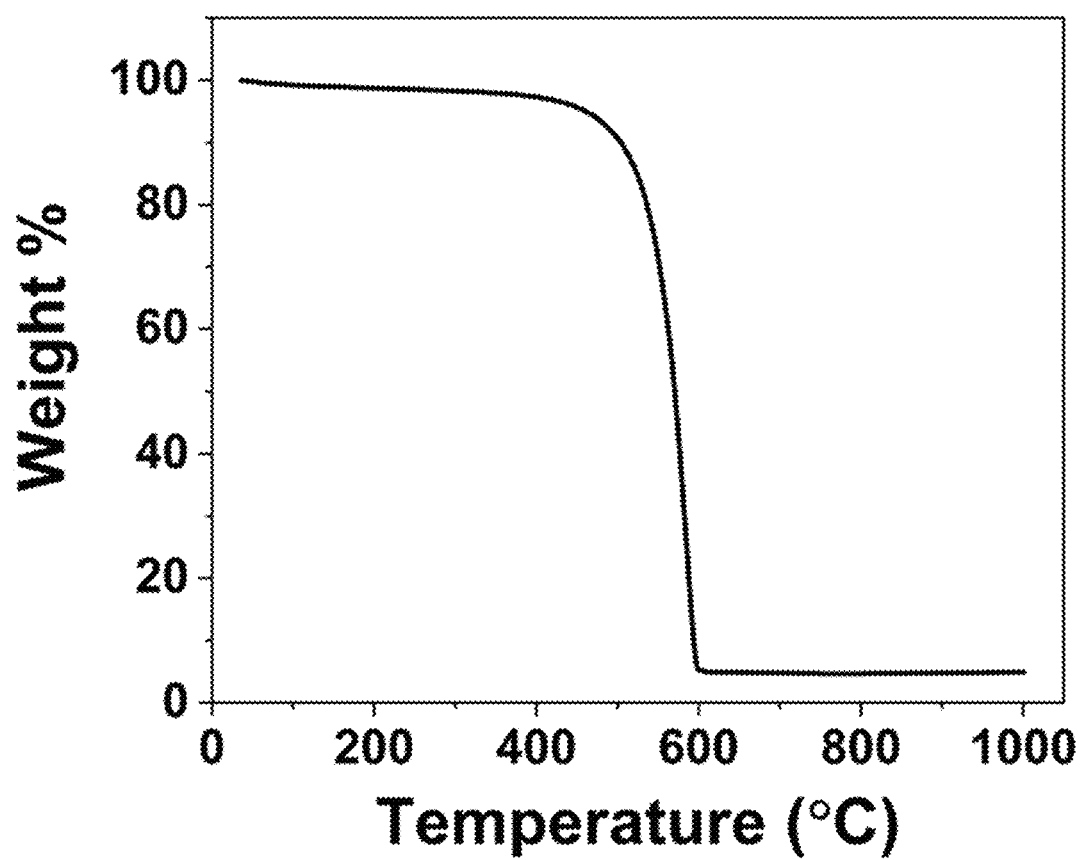
FIG. 6 is a plot of weight % vs. temperature (° C.), and presents a TGA of TC to determine carbon and impurity content with a ramp rate of 10° C./min to a maximum temperature of 1000° C.
Figure 7:
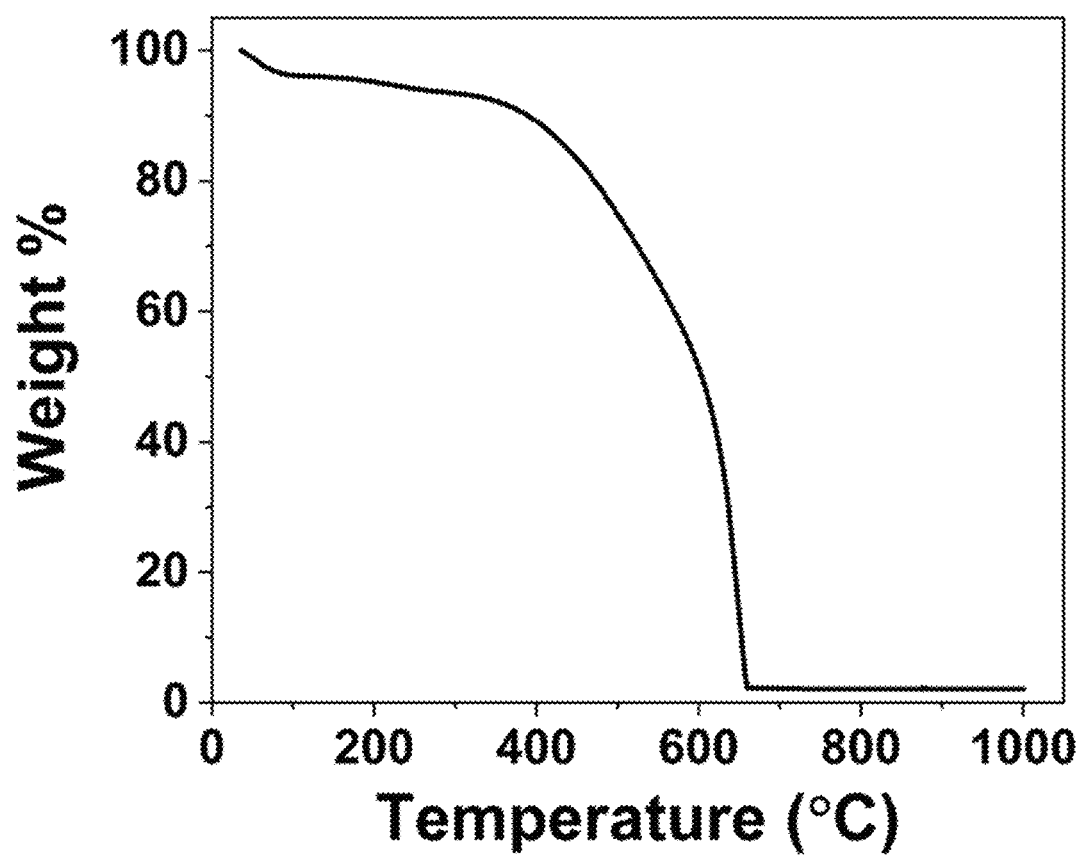
FIG. 7 is a plot of weight % vs. temperature (° C.), and presents a TGA of CPC to determine carbon and impurity content with a ramp rate of 10° C./min to a maximum temperature of 1000° C.

XRD analyses of TC and CPC in FIG. 3 display the expected (002) and (101) amorphous carbon peaks. FIG. 3 is XRD spectra of TC and CPC from 10-90 2Θ. The BET surface area of TC was calculated from FIG. 4. FIG. 4 is the adsorption-desorption isotherm of KOH-treated carbon, with a calculated surface area of 952 $m^2/g$. After coating with polyaniline, the surface area of CPC decreased to 28 $m^2/g$, as seen in FIG. 5. FIG. 5 is the adsorption-desorption isotherm of CPC. Prior to adding the oxidizing agent to begin polymerization, sonication was performed to ensure that the formation of PANI occurred within the meso- and micro-pores of TC, decreasing the overall surface area of the material. Adsorption-desorption experiments display a Type IV isotherm, indicative of a hierarchical meso and microporous structure. The adsorption value is lower than previously reported forms of carbon, due to the presence of impurities inherent to the carbon source from waste tires. Sulfur, oxygen, and silicon impurities remain at 4 wt. % after treatment based on TGA analysis in FIG. 6 and FIG. 7. FIG. 6 presents the TGA of TC to determine carbon and impurity content with a ramp rate of 10° C./min to a maximum temperature of 1000° C. FIG. 7 presents the TGA of CPC to determine carbon and impurity content with a ramp rate of 10° C./min to a maximum temperature of 1000° C.

Figure 8:
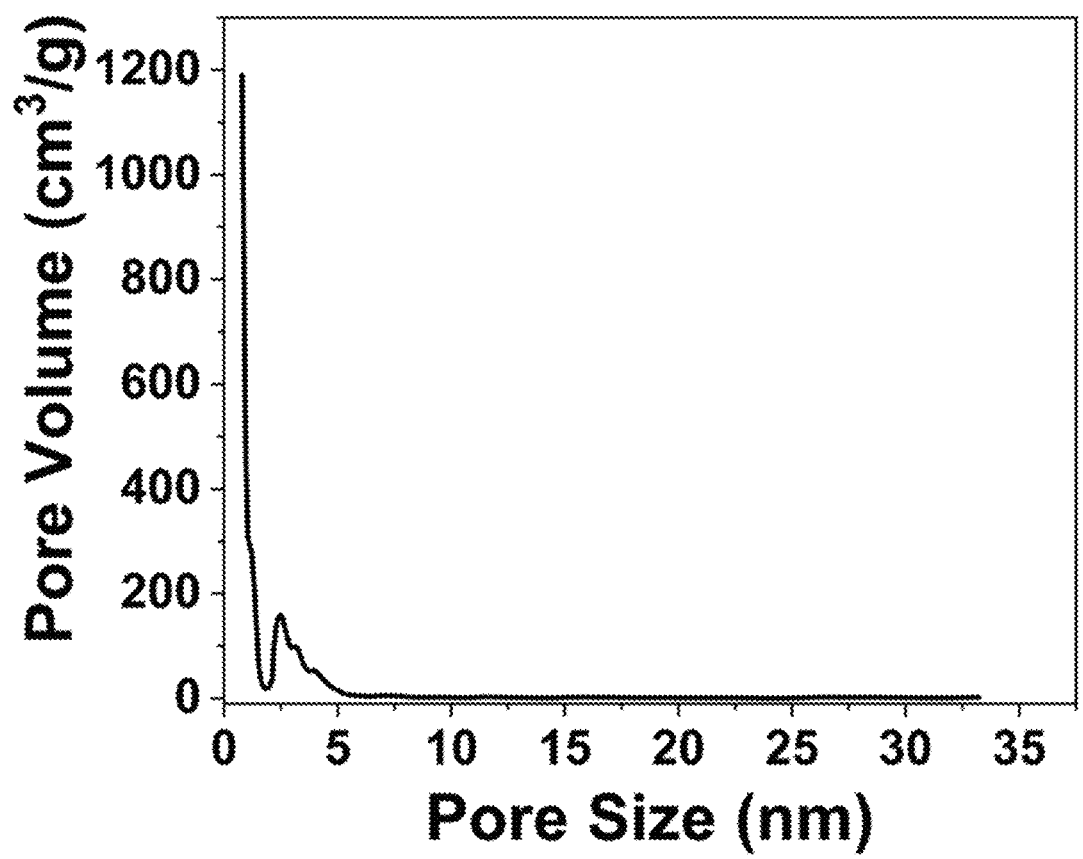
FIG. 8 is a plot of pore volume ($cm^3/g$) vs. pore size (nm), and presents a calculated pore size distribution of TC.
Figure 9:
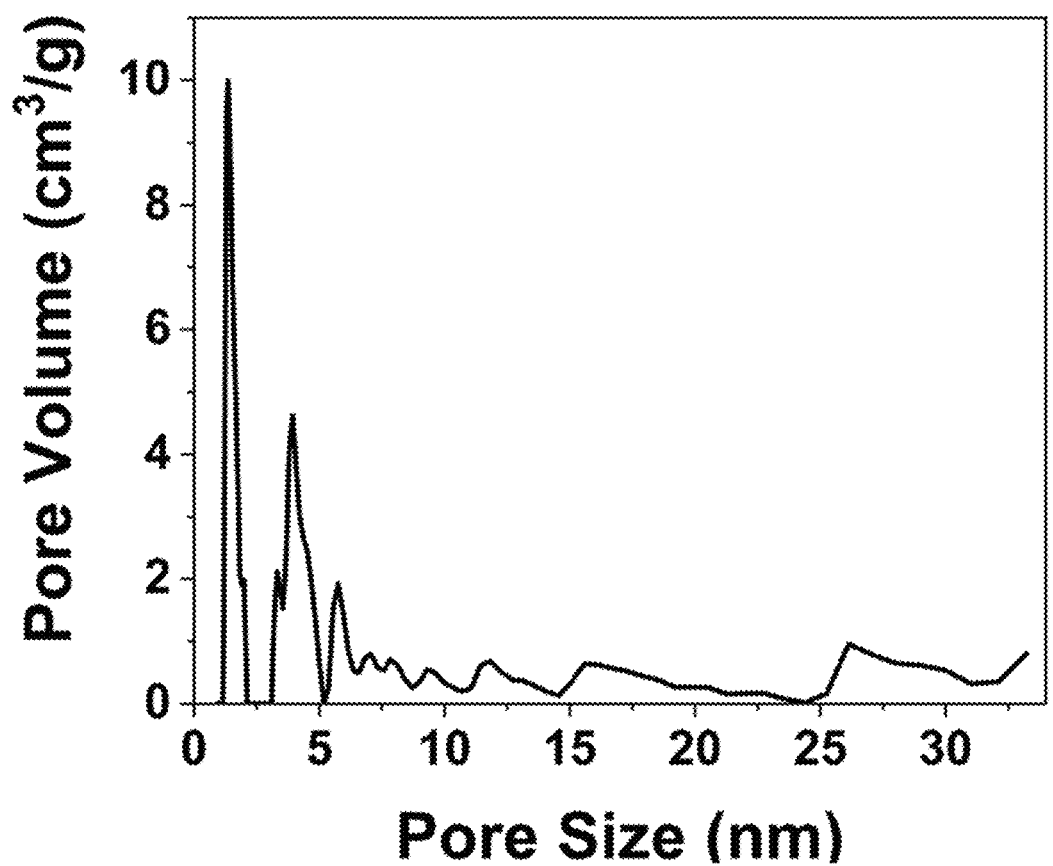
FIG. 9 is a plot of pore volume ($cm^3/g$) vs. pore size (nm), and presents a calculated pore-size distribution of CPC.
Figure 10A:
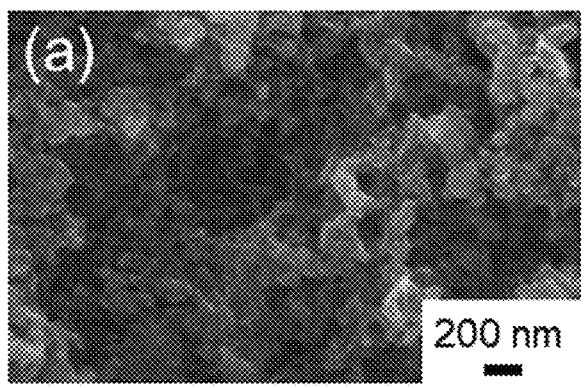
FIG. 10A is an SEM image of TC.
Figure 10B:
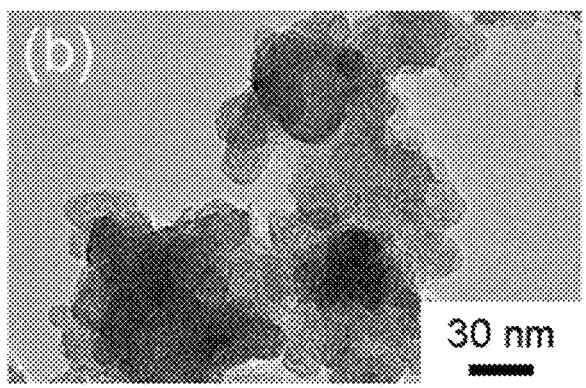
FIG. 10B is a TEM image of TC.
Figure 10C:
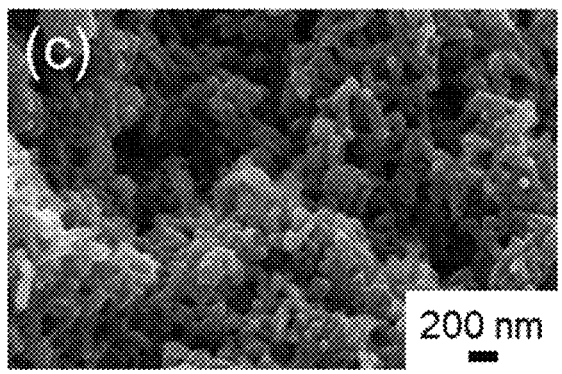
FIG. 10C is an SEM image of CPC.
Figure 10D:
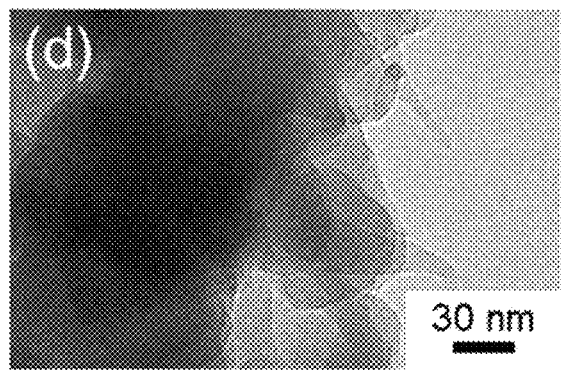
FIG. 10D is a TEM image of CPC.

Pore analysis (FIG. 8 and FIG. 9) also confirmed the introduction and retention after coating, of sub-2-nm pores to the composite, while still retaining its mesoporous (2-50 nm) structure. FIG. 8 presents the calculated pore size distribution of TC, where sub 2 nm and 3-5 nm pores are apparent. FIG. 9 presents the calculated pore-size distribution of CPC. Here microporous regions (sub-2-nm) are apparent with additional mesoporous regimes. SEM and TEM microscopy images further corroborate the coating of TC with PANI. An amorphous carbon structure is shown in FIG. 10A and FIG. 10B. Once coated with PANI, the surface of TC is softened (as shown in FIG. 10C) as the polymer intercalates into its meso and microporous structure. FIG. 10D confirms the full coating, as the surface of TC is now obscured. The change in surface roughness is apparent after the PANI coating of TC.

Figure 11:
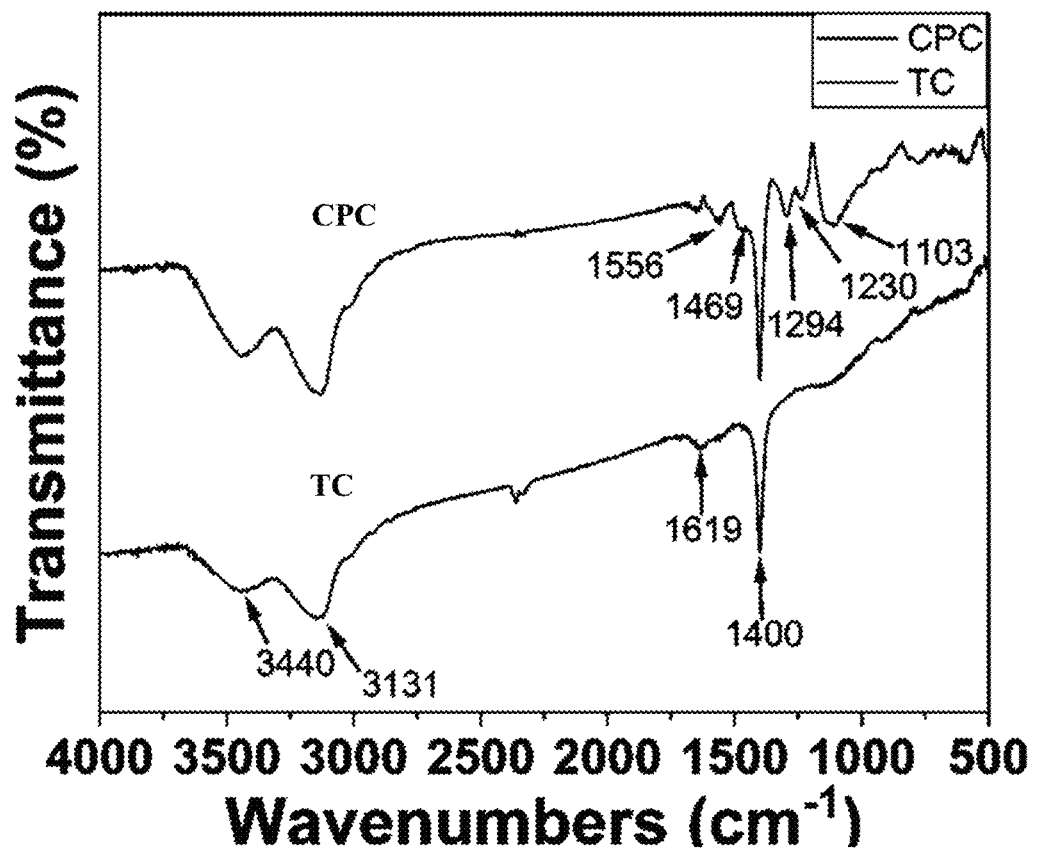
FIG. 11 is a plot of transmittance (%) vs. wavenumbers ($cm^{-1}$), and presents FT-IR spectra of TC and CPC.
Figure 12:
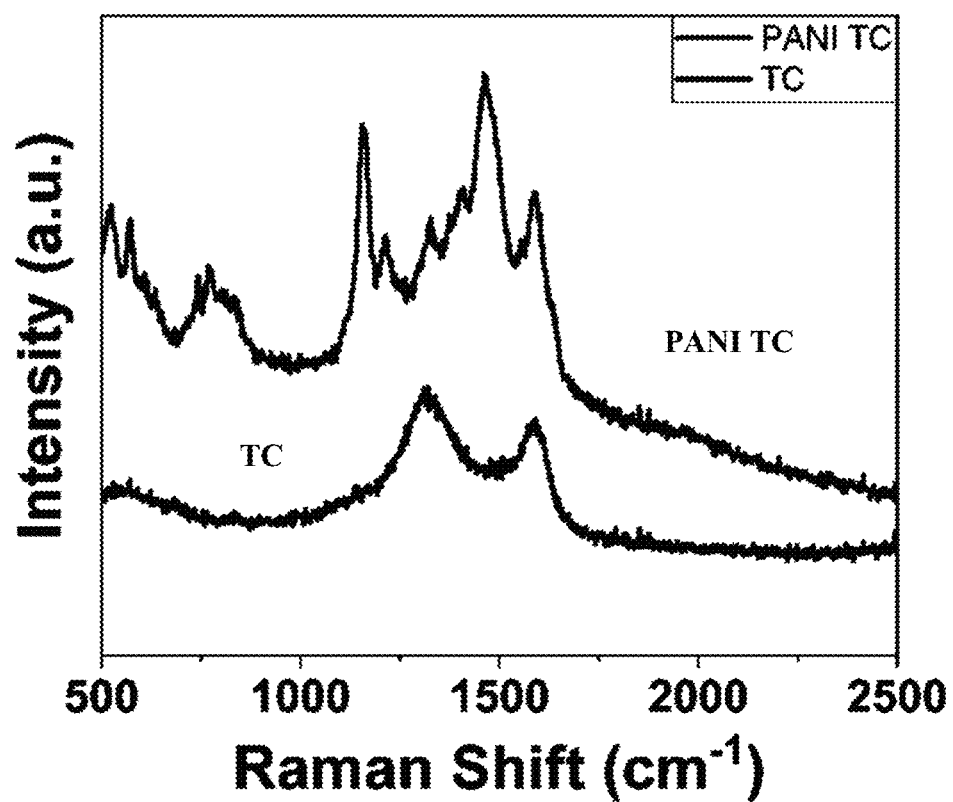
FIG. 12 is a plot of intensity (a.u.) vs. Raman shift ($cm^{-1}$), and presents a Raman plot of TC and CPC.

FT-IR data in FIG. 11 of TC displays clear C=C, C=O, and —OH stretches at 1619, 1400, and 3440 $cm^{-1}$, respectively. FIG. 11 presents the FT-IR spectroscopy of TC and CPC. The spectra clearly show the introduction of conducting aniline polymer after coating of TC. Oxygen-based functional groups are expected due to the presence of oxygen impurities in the carbon material. Any N—H functionalities present in the 3400-3100 $cm^{-1}$ region of the spectra are masked by the broad peaks from —OH and C—H functional groups present in the carbon. The PANI polymer coating introduced multiple features in the fingerprint region, at 1103, 1230, 1295, 1469, and 1556 $cm^{-1}$, that are associated with different aromatic modes of the structure. The feature at 1103 $cm^{-1}$ indicates that the conducting form of the polymer is present on the surface of the carbon material. Raman spectroscopy of TC and CPC confirmed the presence of D and G bands, in addition to the conducting form of PANI. FIG. 12 shows D and G bands at 1333 and 1595 $cm^{-1}$, respectively, indicating presence of disordered amorphous and ordered graphene carbon structures, which has also been confirmed in our previous analysis with high resolution STEM images and selected area electron diffraction patterns. After TC underwent PANI coating, peaks for the conducting form of the polymer were present at 516, 572, 763, 776, 817, 838, 1162, 1218, 1412, 1467, and 1559 $cm^{-1}$. This finding was in agreement with previous work on this carbon composite.

Figure 13:
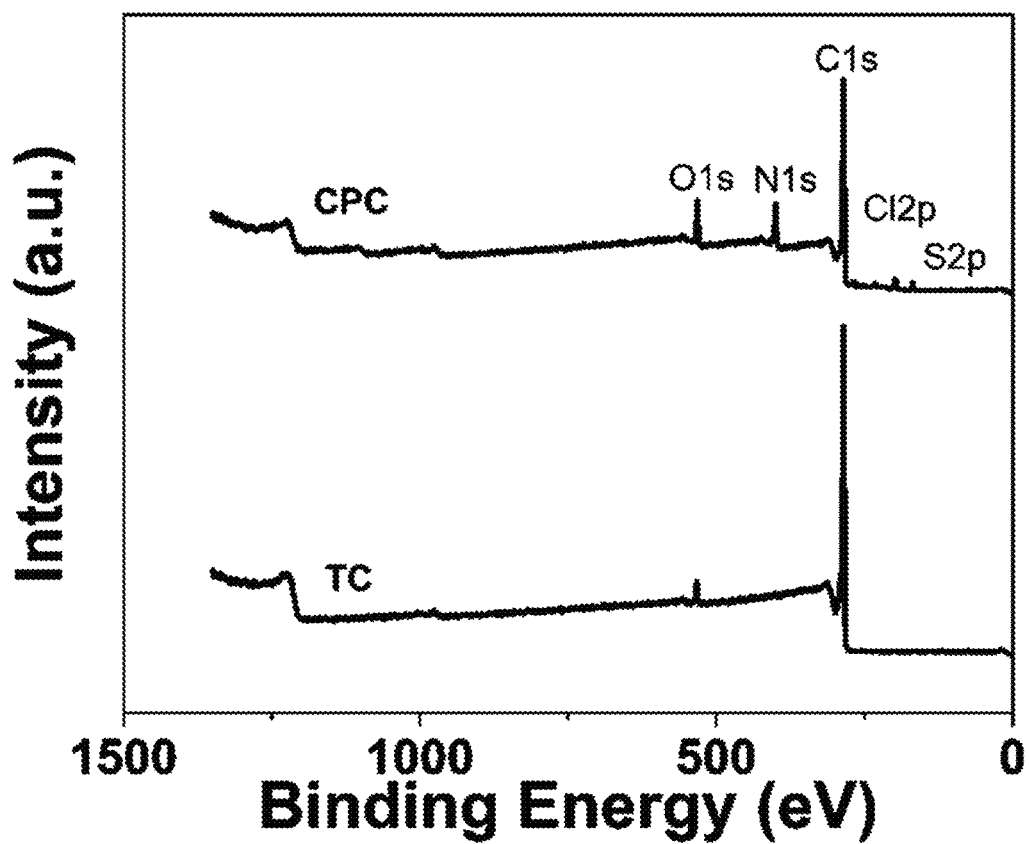
FIG. 13 is a plot of intensity (a.u.) vs. binding energy (eV), and presents a XPS survey scan of TC and CPC displaying the introduction of nitrogen and chlorine.
Figure 14:
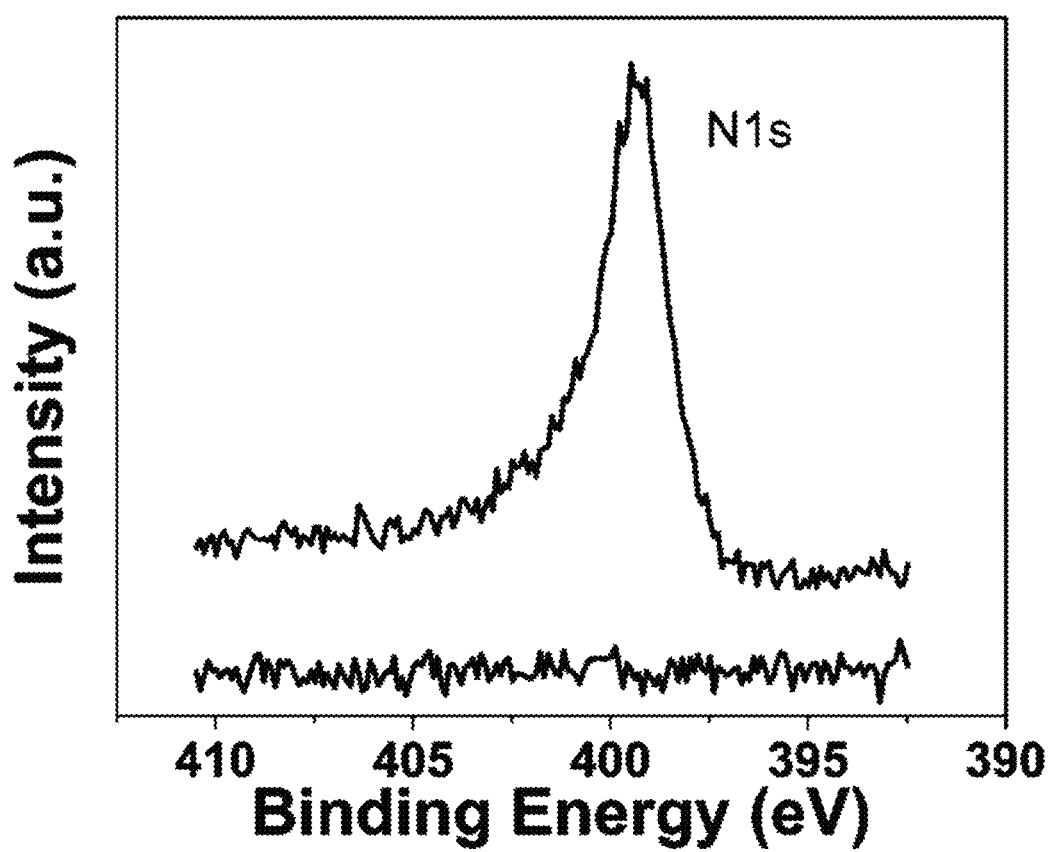
FIG. 14 is a plot of intensity (a.u.) vs. binding energy (eV), and presents a XPS scan of N1s energy level.
Figure 15:
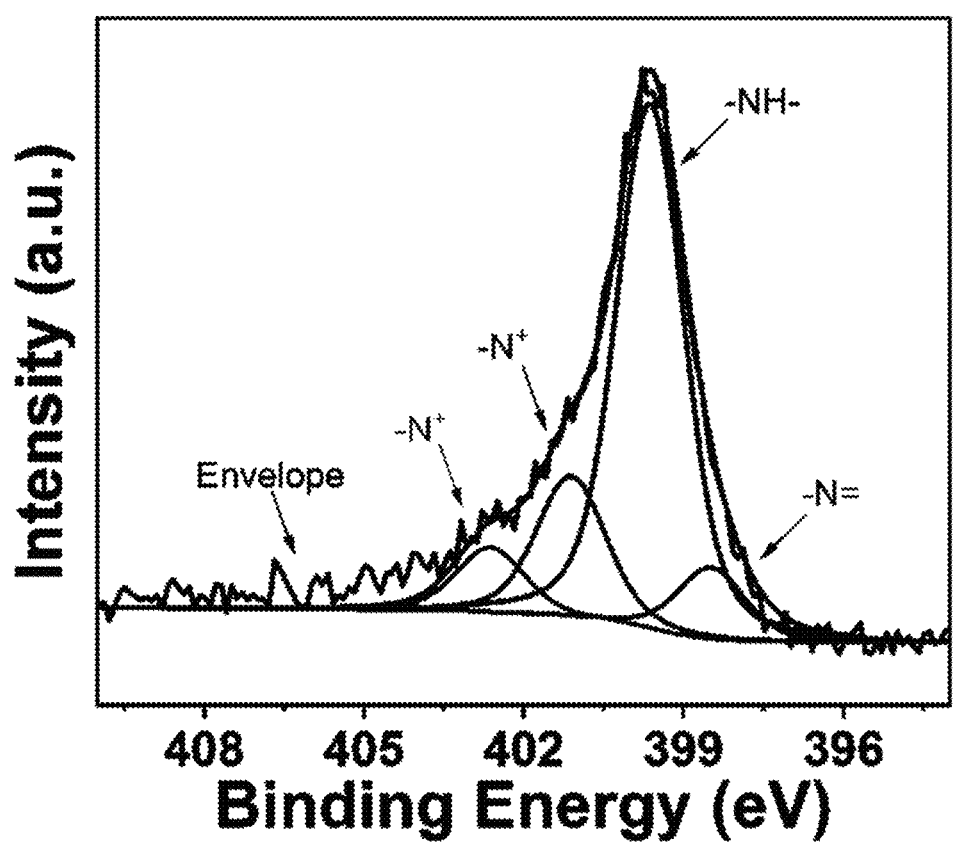
FIG. 15 is a plot of intensity (a.u.) vs. binding energy (eV), and presents a deconvolution of N1 s.
Figure 16:
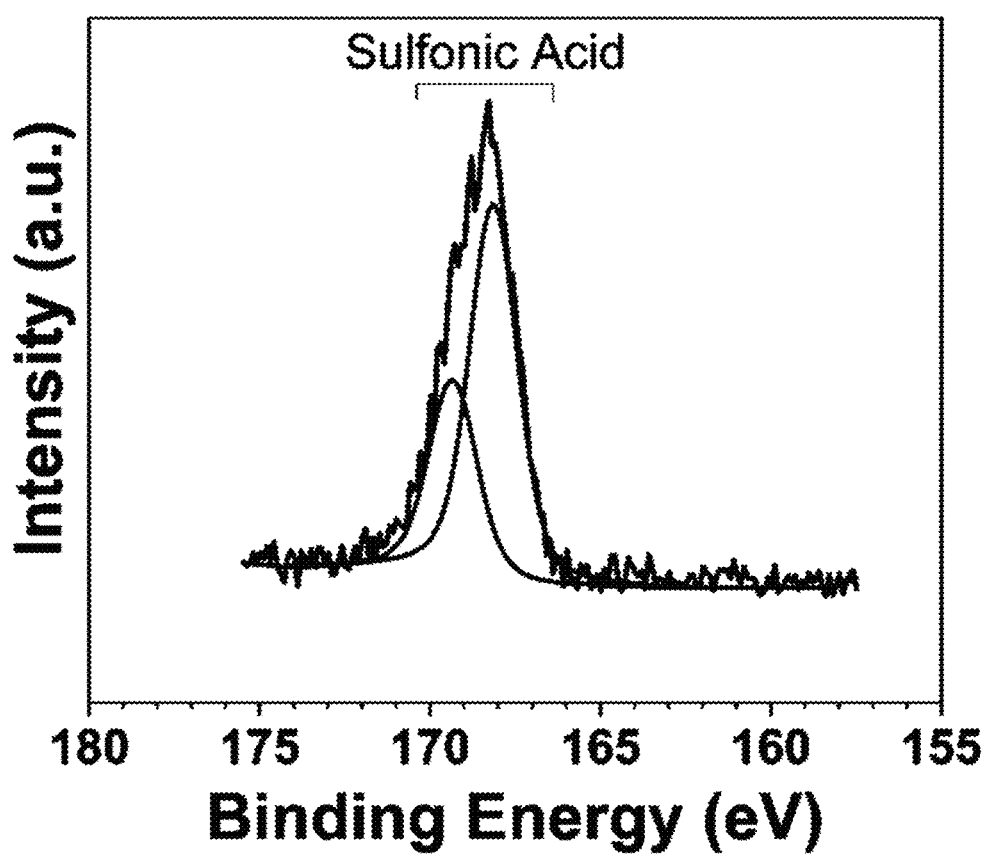
FIG. 16 is a plot of intensity (a.u.) vs. binding energy (eV), and presents a deconvolution of S 2p.

X-ray photoelectron spectroscopy (XPS) was employed to analyze the surface composition of TC and CPC before and after PANI coating. The XPS spectra for the N1s peak are shown in FIG. 13 and FIG. 14 at ~400 eV. FIG. 13 shows the XPS survey scan of TC and CPC displaying the introduction of nitrogen and chlorine; chlorine is from the HCl solution for polymer coating. FIG. 14 shows the XPS scan of N1s energy level, showing the introduction of nitrogen after PANI polymer coating. Deconvolution of this peak in FIG. 15 confirms the presence of nitrogen from the PANI. FIG. 15 presents the deconvolution of N1s, and the presence of N+ is attributed to the leftover ammonium persulfate oxidizer from polymer synthesis. Impurities from the polymerization process remain. $N^+$ is found in observable amounts from the deconvolution. This could be due to the presence of remaining oxidizer from the polymerization process that has become trapped in the forming polymer. Further evidence of this possibility is seen in the change of the S 2p peak at ~168 eV (FIG. 16). FIG. 16 presents the deconvolution of S 2p. The large increase in sulfonic acid compared to TC's sulfonic acid and thiophene groups are again attributed to leftover ammonium persulfate oxidizer. TC initially contains both sulfonyl and thiophene sulfur groups. After coating, the signal for sulfonyl-based sulfur increases drastically, again leftover from the ammonium sulfate oxidizer. The polymer coating was performed in 1 M HCl solution; so, the peak at ~190 eV in FIG. 13 reasonably indicates the presence of remaining chloride ions. The remaining ions from polymer preparation do not drastically affect CDI performance, as the electrodes were sufficiently discharged in deionized water before desalination tests.

Figure 17:
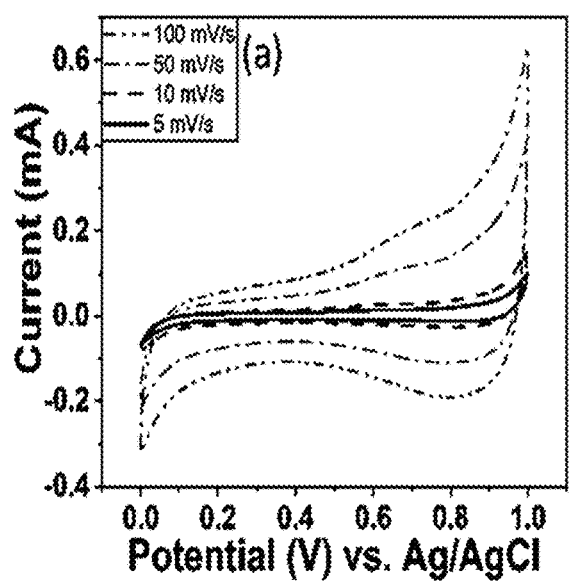
FIGS. 17A-17B are a plot of current (mA) vs. potential (V) vs/Ag/Ag/Cl and a plot of voltage (V) vs. time (sec), and present an electrochemical analysis of CPC using.
Figure 17B:
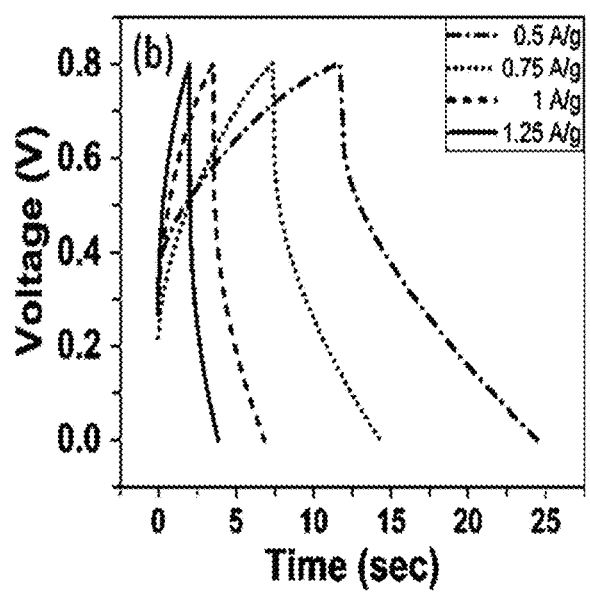
Figure 18:
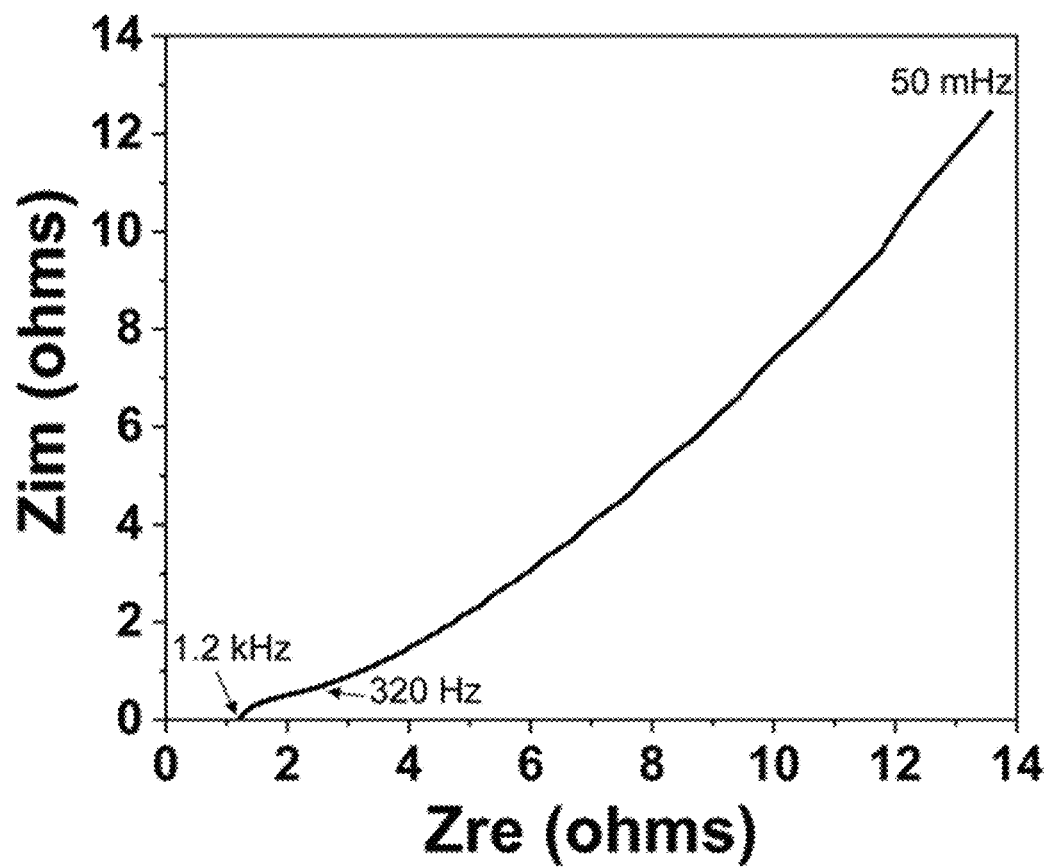
FIG. 18 is a plot of $Z_{im}$ (ohms) vs $Z_{re}$ (ohms), and presents electrochemical impedance spectroscopy (EIS) results for CPC, measured from 200 kHz to 0.05 Hz with an amplitude of 10 mV RMS.
Figure 19:
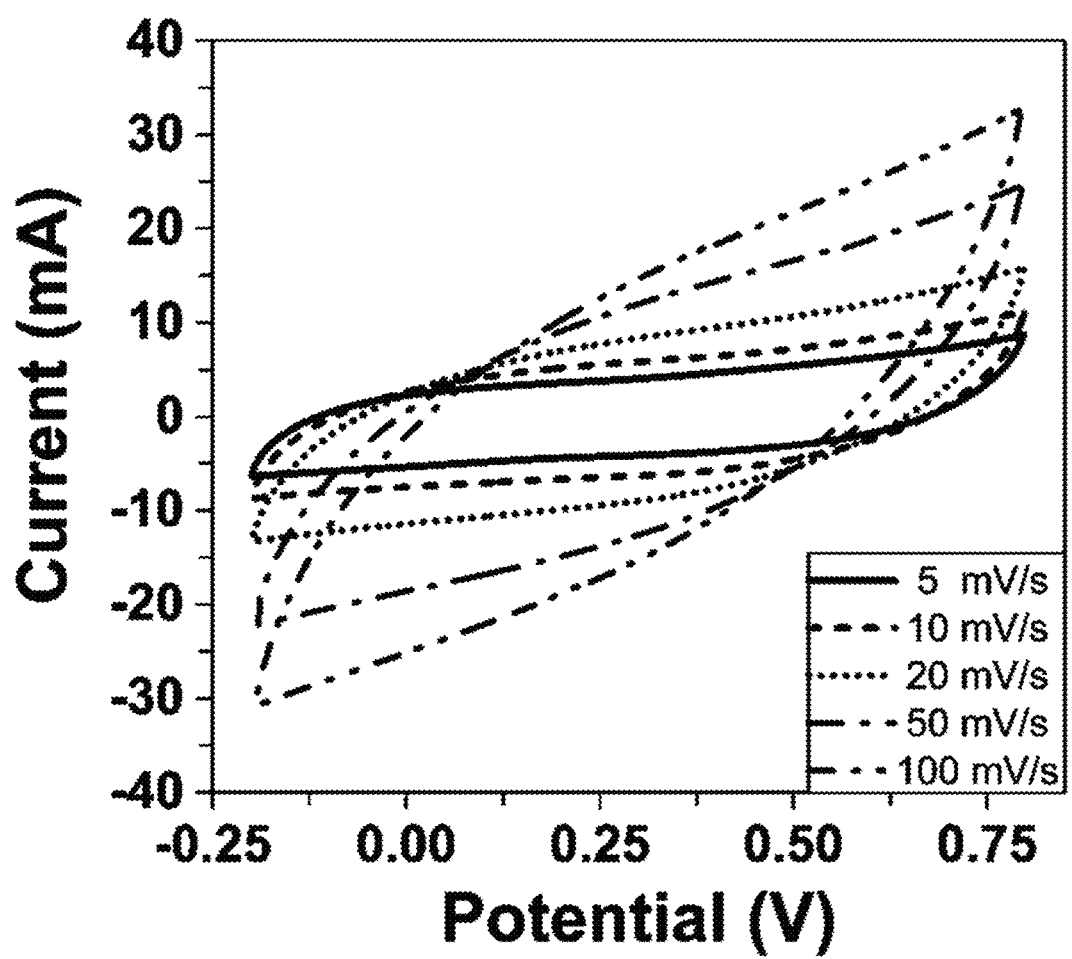
FIG. 19 is a plot of current (mA) vs. potential (V), and presents a symmetric 2-electrode cell of CPC for capacitance calculations.

The capacitance and electrochemical characteristics of the CPC electrodes were determined using CV, GCD, and EIS. FIG. 17 presents the electrochemical analysis of CPC using (A) CV with a Ag/AgCl reference at various scan rates and (B) GCD at with various charge densities. The CV curves in FIG. 17A indicate the combined response from faradaic and non-faradaic processes vs Ag/AgCl reference electrode and platinum mesh counter electrode. The GCD profile in FIG. 17B does not have a symmetric charge and discharge due to tailing at peak voltage, indicating occurrence of the combination of faradaic and non-faradaic processes. This asymmetry is due to the hybrid nature of the surface redox reactions and ion shuttling occurring in the material. FIG. 18 is the EIS of CPC, measured from 200 kHz to 0.05 Hz with an amplitude of 10 mV RMS. The semi-circular region of the EIS in FIG. 18 is evidence of both faradaic and non-faradaic diffusion processes. The specific capacitance of the electrodes was 168.2 F/g; this value was calculated from the CV of a symmetric 2-electrode cell in FIG. 19, using equation 1. FIG. 19 presents the symmetric 2-electrode cell of CPC for capacitance calculations.

Figure 20:
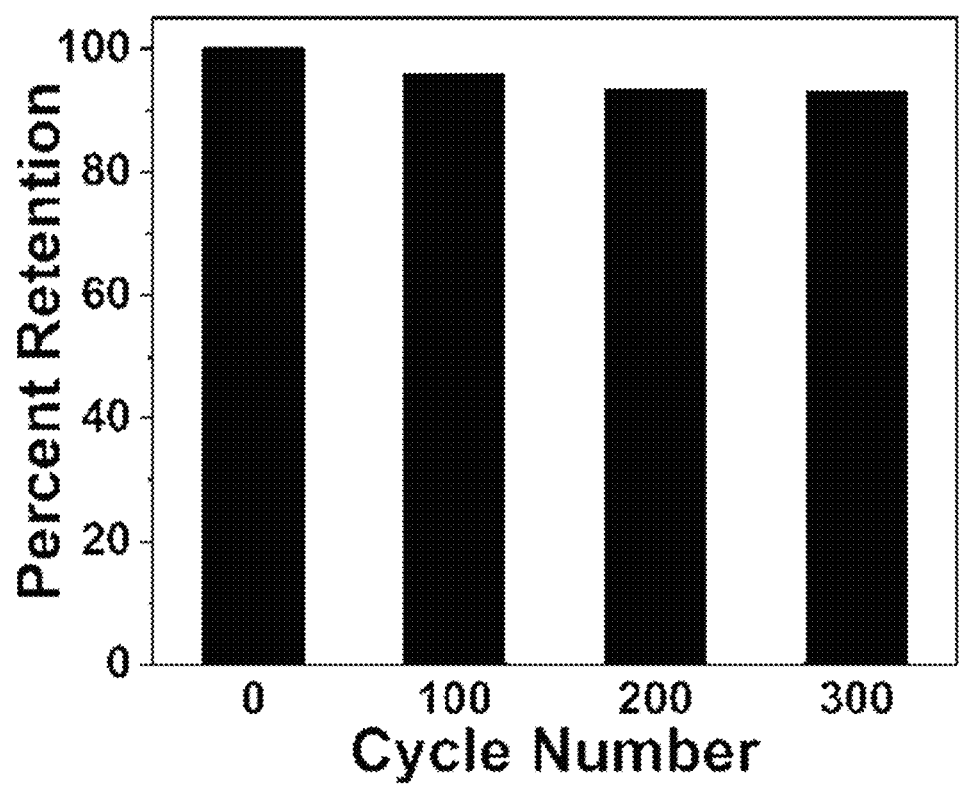
FIG. 20 is a comparison of charging capacity for 300 cycles of charging for the CPC on nickel foam with PTFE binder at a charge density of 500 mA/g to 1.2 V.
Figure 21:
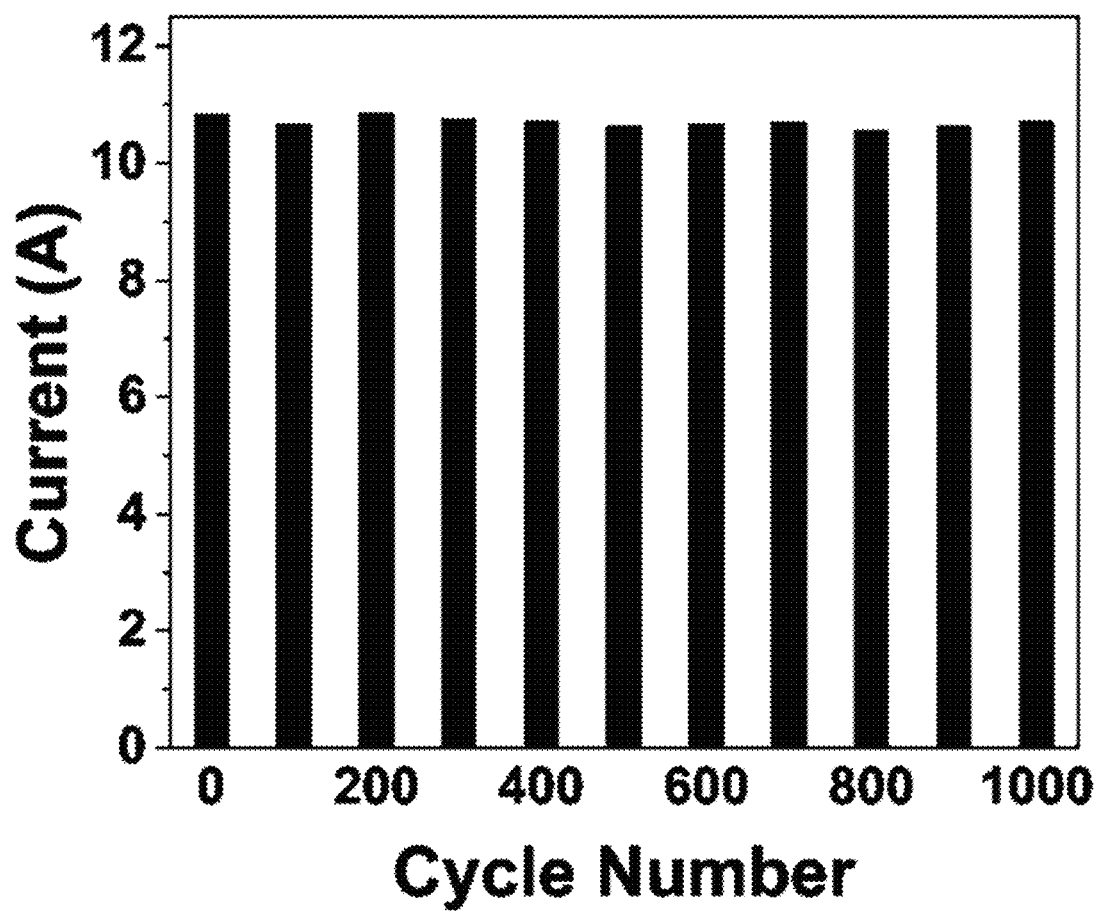
FIG. 21 is a plot of current (A) vs. cycle number, and presents a plot of current response over 1000 cycles while charging to 1.2 V and discharging to 0 V.

Capacity loss in CPC is much lower than that for other CDI materials. FIG. 20 shows a comparison of charging capacity for 300 cycles of charging for the CPC on nickel foam with PTFE binder at a charge density of 500 mA/g to 1.2V. Cycling data for CPC in FIG. 20 displays over 95% of capacity is retained over 100 cycles of charging and discharging. Further tests of 200, and 300 cycles have shown retentions of 93.3, and 92.8% respectively. The investigated carbon electrode has exceptional capacity retention compared to all other CDI electrode materials reported in the literature. These positive effects are thought to come from penetration of the PANI into the micro- and mesopores of the carbon, thereby providing a structural support. Additionally, the carbon dissipates charge facilely, protecting PANI from deleterious side reactions that rapidly degrade salt-adsorption capacity. This hypothesis was tested by performing constant-current cycling tests with TC, PANI, and CPC. Constant-current testing of CDI electrodes is more desirable for industrial scale-up. FIG. 21 presents the current response over 1000 cycles while charging to 1.2 V and discharging to 0 V. The results in FIG. 21 provide strong evidence of the robust nature of these electrodes. PANI degrades after only a few cycles due to degrading redox reactions that occur with the polymer. TC retains a stable current response over 1000 cycles, however, desalination tests with only carbon-based electrodes resulted in poor salt adsorption, with 3 mg/g SAC. The combination of PANI and TC produces a composite that retains good cycling capacity of the carbon while enhancing adsorption capacity with the PANI coating on TC. The deionization performance of the CPC electrodes is still good despite the drop in CPC surface area compared to the starting tire-derived carbon.

Figure 22:
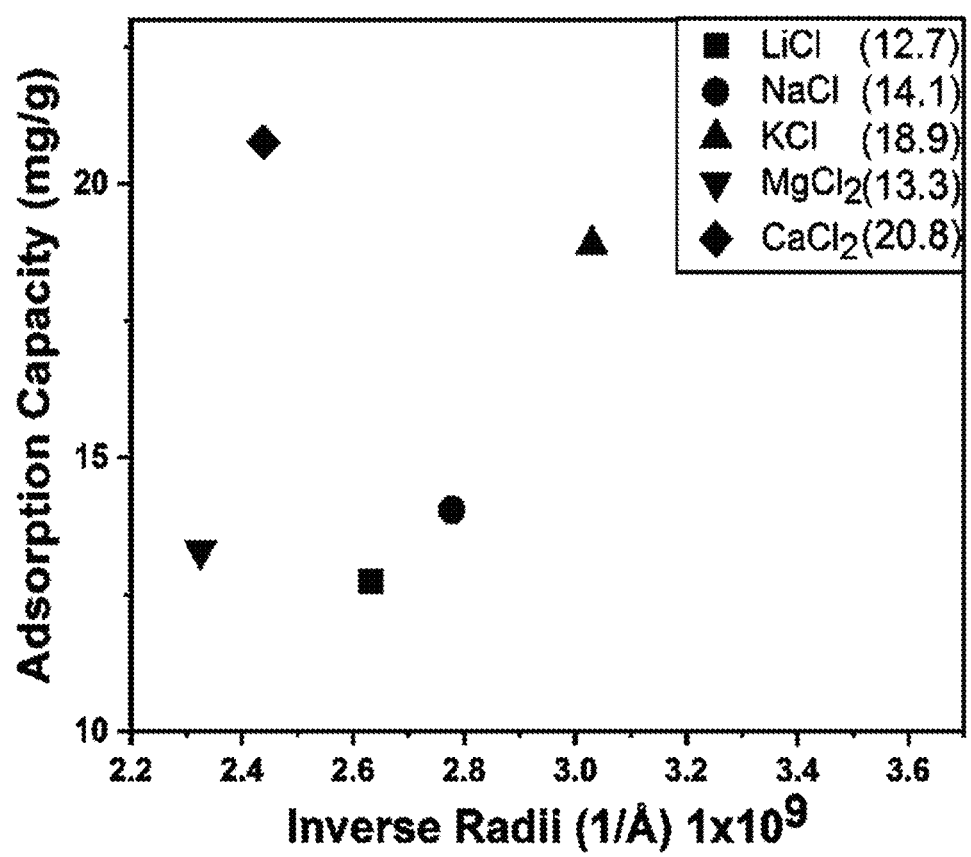
FIG. 22 is a plot of adsorption capacity (mass adsorbed per mass of adsorbent, mg/g) vs. inverse radii (1/Å), and presents a correlation between salt uptake capacity and inverse radius of solvated monovalent and divalent cations.

Multiple CDI apparatus setups were used to establish the ion-uptake capacity of the CPC electrodes. A batch cell design was used for initial testing in stagnant brine. Monitoring brine loss and using equation 2, the SAC of CPC was found to be 14.2 mg/g. Flow-cell CDI has depressed uptake values due to several factors. Salt migration distance between the electrodes was increased, resulting in mass transport issues. Without the protection of a membrane, the electrodes suffered from additional surface reactions. During these tests, the electrode SAC was 12.4 mg/g. To mitigate the small amount of electrode degradation and improve salt uptake, ionic membranes were used. Adding the membranes reduces ion crossover that occurs during multiple electrode cycles. Ion crossover can decrease the total salt uptake due to interference from ions of different charge on the surface of the electrodes. Ionic membranes selectively allow only positively or negatively charged ions to interact with the respective electrodes, reducing this interference. Without ion crossover there is an improvement in the formation of electrical double layers, improving salt uptake. By incorporating ionic membranes for membrane-assisted capacitive deionization, MCDI, the double layer and surface-reaction issues were reduced. Incorporating ionic membranes led to an elevated salt uptake of 18.9 mg/g, much improved from the initial flow-cell and batch scale tests. Following initial tests with KCl other adsorption tests with mono and divalent ions were also investigated. FIG. 22 provides a correlation between salt uptake capacity and inverse radius of solvated monovalent and divalent cations. As electronegativity decreases and the inverse radius increases, the overall adsorption capacity also increases. Adsorption capacity values are reported in parenthesis. In FIG. 22, it is shown that as the solvated radius of the bare cations increases, the adsorption capacity decreases. This is due to the ease of removal of surface water from less electronegative ions compared to more electronegative species, such as Li.

A comparison of the CDI electrode material uptake capacities in Table 1 showcases that CPCs have competitive salt adsorption values for NaCl.

TABLE 1

The uptake capacities of different CDI electrodes compared to the invention.

| Electrode Material | Specific Surface Area ($m^2/g$) | Initial Salt Concentration (ppm) | Ion Capacity (mg/g) |
|---|---|---|---|
| Activated Carbon Powder | 1153 | 1000 | 10.8 |
|  |  | 1500 | 11 |
|  |  | 292 | 14.2 |
| Activated Carbon Nanofiber | 670 | 4000 | 8.9 |
| Carbide-Derived Carbon |  | 292 | 14.9 |
| Graphene | 384.4 | 25 | 6.18 |
| Reduced graphene oxide with activated carbon fiber composite | 621 | 400 | 7.2 |
| Multiwalled carbon nanotube | 208 |  | 13.07 |
| Activated Carbon Cloth | 1200 | 100 | 5.8 |
| Carbon Xerogel | 196.2 | 233 | 1.9 |
| Resorcinol based mesoporous carbon on graphite | 488 | 5000 | 13.8 |
| Carbon nanofiber - 600 (based on phenolic resin) | 481 | 2000 | 20.1 |
| CNF-800 | 579 |  | 35.9 |
| CNF-1000 | 617 |  | 50.1 |
| $KHCO_3$ treated meso/microporous carbon | 2726 | 1000 | 16.63 |
| N-doped bimetallic zeolite imidazolate framework | 813 | 500 | 12.25 |
| Carbon derived from metal-organic frameworks | 848 | 100-500 | 20.05 |
| N-doped hollow multi yolk shell carbon (N doped-HMY SC) | 910 | 500 | 16.1 |

TABLE 1-continued

The uptake capacities of different CDI electrodes compared to the invention.

| Electrode Material | Specific Surface Area ($m^2/g$) | Initial Salt Concentration (ppm) | Ion Capacity (mg/g) | |
|---|---|---|---|---|
| CPC Batch - CDI | 952 | 1500-1700 | 14.2 (KCl) | Invention |
| CPC Flow - CDI | | | 12.4 (KCl) | |
| CPC Flow - MCDI | | | 18.9 (KCl) | |
| | | | 14.1 (NaCl) | |

Compared to other carbon-black materials, the invention provides among the best data in terms of desalination ability. Other composites and engineered carbons display similar or higher salt-uptake but fall short in terms of cycling longevity or high material and synthesis costs. Sourcing of carbon from waste tires is a cheaper alternative, compared to other existing electrode materials. Robust cycling capacities of the carbon materials with uptake capacity and increased cycle lifetimes greatly improves the material cost aspects for this electrode material. Additionally, the electrode material presented has the benefit of sourcing from a significant waste stream, used tires, improving environmental impact.

This invention can be embodied in other forms without departing from the spirit or essential attributes thereof. Reference should be made to the following claims to determine the scope of the invention.

We claim:

1. A capacitive deionization system, comprising:
   a first electrode comprising tire derived carbon particles obtained from a carbonaceous waste-tire source material containing carbon black, a conductive polymer coating on the carbon particles of the first electrode forming first coated carbon particles;
   a second electrode comprising tire derived carbon particles obtained from a carbonaceous waste-tire source material containing carbon black, a conductive polymer coating on the carbon particles of the second electrode forming second coated carbon particles;
   wherein the conductive polymer coating is from 3 to 20 wt. % based on the total weight of the polymer carbon composite coated carbon particles, and wherein the carbon particles have a diameter of from 1 to 200 μm and the conductive polymer coating is from 10 to 500 nm thick;
   the first electrode and the second electrode defining a flow channel there between;
   a first opening for conducting saline solution into the flow channel;
   a second opening for conducting treated saline solution from the flow channel;
   a first open cell metal foam current collector for the first electrode and a second open cell metal foam current collector for the second electrode;
   an anion exchange membrane adjacent to the first electrode, and a cation exchange membrane adjacent to the second electrode; and,
   an electrical connection between the first and second electrodes.

2. The capacitive deionization system of claim 1, wherein the first plurality of coated carbon particles are adhered to the open cell metal foam current collector of the first electrode, and a second plurality of coated carbon particles are adhered to the open cell metal foam current collector of the second electrode.

3. The capacitive deionization system of claim 1, further comprising a power source connected to the electrical connection for creating a field between the first and second electrodes.

4. The capacitive deionization system of claim 1, wherein the conductive polymer coating comprises at least one selected from the group consisting of polyaniline, polythiophene, polypyrrole, poly(p-phenylene).

5. The capacitive deionization system of claim 1, wherein the current collector comprises a metal foam, the metal comprising at least one of the selected from the group consisting of Ni, Pd, Pt, Ti, Zr, Hf, Cu, Ag, Au, and stainless steel.

6. The capacitive deionization system of claim 1, wherein the current collector comprises a metal foam having a porosity of from 5 to 70%.

7. The capacitive deionization system of claim 1, wherein the current collector comprises a metal foam having a thickness of 10 to 500 μm.

8. The capacitive deionization system of claim 1, wherein the current collector comprises a metal foam having a surface area of from 1 to 100 $m^2/g$.

9. The capacitive deionization system of claim 1, wherein the surface area of the carbon particles is from 100 $m^2/g$ to 1600 $m^2/g$.

10. The capacitive deionization system of claim 1, wherein the carbon particles have a porosity of from 0.01 to 10%.

11. The capacitive deionization system of claim 1, wherein the carbon particles comprise pores having a pore size of from 0.02 to 80 nm.

12. The capacitive deionization system of claim 1, wherein the electrode further comprises a binder for adhering the carbon particles together.

13. The capacitive deionization system of claim 12, wherein the binder comprises at least one selected from the group consisting of polytetrafluoroethylene (PTFE), polyvinylidene fluoride (PVDF).

14. The capacitive deionization system of claim 1, wherein the carbon particles are obtained from waste tire that has been sulfonated by contacting the carbonaceous source material with an oleum bath.

15. The capacitive deionization system of claim 1, wherein the carbon particles are obtained from waste tire that has been pyrolyzed to produce a layered carbon black containing product comprising a glassy carbon matrix phase having carbon black dispersed therein, the layered carbon black containing product having an interlayer spacing of from 0.4 to 0.5 nm.

16. The capacitive deionization system of claim 15, wherein the pyrolization temperature is from 600 to 1600° C.

17. The capacitive deionization system of claim 1, wherein the electrode spacing is from 5 mm to 50 mm.

18. The capacitive deionization system of claim 1, wherein a first plurality of the coated carbon particles are suspended in the saline solution and flow through a first flow electrode, and a second plurality of the coated carbon particles are suspended in the saline solution and flow through a second flow electrode.

19. The capacitive deionization system of claim 1, wherein the system is a multi-electrode system comprising multiple pairs of alternating first and second electrodes.

20. A method of making a system for capacitive deionization of a salt from a liquid, comprising the steps of:
providing tire derived carbon particles, wherein carbon particles have a diameter of from 1 to 200 µm;
coating the carbon particles with a conductive polymer, wherein the conductive polymer coating is from 3 to 20 wt. % based on the total weight of the polymer carbon composite coated carbon particles, and wherein the conductive polymer coating is from 10 to 500 nm thick;
binding the coated carbon particles together with a binder and adhering the carbon particles to a respective open cell metal foam current collector to form first and second electrodes;
securing the first and second electrodes in spaced relation to form a saline flow channel, the flow channel having a saline solution inlet and a saline solution outlet;
providing an anion exchange membrane adjacent to the first electrode, and a cation exchange membrane adjacent to the second electrode;
electrically connecting the first and second electrodes to form a capacitor.

21. The method of claim 20, wherein the salt is at least one selected from the group consisting of NaCl, LiCl, KCl, $MgCl_2$, $CaCl_2$, and $SrCl_2$.

22. The method of claim 20, wherein the carbon particles are obtained from waste tire that has been sulfonated by contacting the carbonaceous source material with an sulfonation bath.

23. The method of claim 22, wherein the sulfonation bath comprises sulfonation agent is chlorosulfonic acid in 1,2 dichloroethane solution.

24. The method of claim 22, wherein the sulfonation bath comprises between 0.1-65 wt. % $SO_3$.

25. The method of claim 22, wherein the sulfonation bath comprises 2-30 wt. % $SO_3$.

26. The method of claim 22, wherein the sulfonation bath has a temperature of between −20° C. to 200° C.

27. The method of claim 20, wherein the carbon particles are obtained from waste tire that has been pyrolyzed to produce a layered carbon black containing product comprising a glassy carbon matrix phase having carbon black dispersed therein, the layered carbon black containing product having an interlayer spacing of from 0.4 to 0.5 nm.

28. The method of claim 27, wherein the pyrolysis step is conducted at a temperature from 600-1490° C.

29. The method of claim 27, wherein the duration of the pyrolysis step is from 1 minute to 12 hours.

30. The method of claim 27, wherein the first coated carbon particles are mixed with a binder and adhered to the first current collector, and wherein the second coated carbon particles are mixed with a binder and adhered to the second current collector.

31. The method of claim 27, wherein the first electrode is a first flow electrode, and the second electrode is a second flow electrode, and the first coated carbon particles are suspended in the saline solution and caused to flow through the first flow electrode, and the second coated carbon particles are suspended in the saline solution and caused to flow through the second flow electrode.

32. A method for the capacitive deionization of a saline solution, comprising the steps of:
providing a capacitive deionization system, comprising a first electrode comprising tire derived carbon particles obtained from a carbonaceous waste-tire source material containing carbon black, a conductive polymer coating on the carbon particles of the first electrode forming first coated carbon particles, a second electrode comprising tire derived carbon particles obtained from a carbonaceous waste-tire source material containing carbon black, a conductive polymer coating on the carbon particles of the second electrode forming second coated carbon particles, wherein the conductive polymer coating is from 3 to 20 wt. % based on the total weight of the polymer carbon composite coated carbon particles, and wherein the carbon particles have a diameter of from 1 to 200 µm and the conductive polymer coating is from 10 to 500 nm thick; the first electrode and the second electrode comprising a first open cell metal foam current collector and a second open cell metal foam current collector, the first electrode and the second electrode defining a flow channel there between; a first opening for conducting saline solution into the flow channel; and a second opening for positioning conducting treated saline solution from the flow channel;
providing an anion exchange membrane adjacent to the first electrode, and a cation exchange membrane adjacent to the second electrode;
electrically connecting the first electrode and the second electrode to a power source, whereby an electric field is created between the electrodes;
causing the saline solution to flow through the flow channel and the electric fields, wherein negative ions will be drawn to the first electrode and positive ions will be drawn to the second electrode.

33. The method of claim 32, wherein the saline solution has a salt concentration of from 1000 to 15000 PPM.

34. The method of claim 32, wherein the power source is a standalone power source.

35. The method of claim 32, further comprising the step of performing reverse osmosis on the saline solution prior to the capacitive deionization to reduce the saline concentration to at least 1700 PPM.

36. The method of claim 32, wherein the saline solution comprises at least one selected from the group consisting of NaCl, LiCl, KCl, $MgCl_2$, $CaCl_2$, and $SrCl_2$.

* * * * *

UNITED STATES PATENT AND TRADEMARK OFFICE
CERTIFICATE OF CORRECTION

PATENT NO. : 10,807,888 B2
APPLICATION NO. : 16/256396
DATED : October 20, 2020
INVENTOR(S) : Mariappan Paranthaman et al.

It is certified that error appears in the above-identified patent and that said Letters Patent is hereby corrected as shown below:

On the Title Page

List of inventors should read:
(72) Inventors: Mariappan Paranthaman, Knoxville, TN (US); Amit K. Naskar, Knoxville, TN (US); Constantinos Tsouris, Oak Ridge, TN (US); Marko Robert Ivancevic, Lombard, IL (US); Samuel Frederick Evans, Knoxville, TN (US)

Signed and Sealed this
Eighth Day of August, 2023

Katherine Kelly Vidal
*Director of the United States Patent and Trademark Office*